CONTROL ARRANGEMENT FOR LINE CONCENTRATOR

Filed Dec. 29, 1960 4 Sheets-Sheet 1

INVENTORS M. R. GOTTHARDT
T. N. LOWRY
BY Kenneth B. Hamlin
ATTORNEY

INVENTORS M. R. GOTTHARDT
T. N. LOWRY
BY Kenneth B. Hamlin
ATTORNEY

July 31, 1962 M. R. GOTTHARDT ET AL 3,047,668

CONTROL ARRANGEMENT FOR LINE CONCENTRATOR

Filed Dec. 29, 1960 4 Sheets-Sheet 3

INVENTORS M. R. GOTTHARDT
T. N. LOWRY

BY Kenneth B. Hamlin

ATTORNEY

CONTROL ARRANGEMENT FOR LINE CONCENTRATOR

Filed Dec. 29, 1960 4 Sheets-Sheet 4

INVENTORS M. R. GOTTHARDT
T. N. LOWRY
BY Kenneth B Hamlin
ATTORNEY

United States Patent Office 3,047,668
Patented July 31, 1962

3,047,668

CONTROL ARRANGEMENT FOR LINE CONCENTRATOR

Manfred R. Gotthardt, Succasunna, and Terrell N. Lowry, Boonton, N.J., assignors to Bell Telephone Laboratories, Incorporated, New York, N.Y., a corporation of New York Filed Dec. 29, 1960, Ser. No. 79,438
40 Claims. (Cl. 179—18)

This invention pertains to telephone circuits and more specifically to remote line concentrator circuits for controlling the assignment of links to subscriber lines in a telephone system.

It has been determined that a substantial portion of the expense of a telephone system lies in the cost of the wire used for connecting subscribers' equipment to a central office. The number of paths or links required for connecting a given number of subscribers to an office may be materially reduced by removing a portion of the switching circuitry from the central office and arranging it adjacent the subscribers to be serviced. By the use of such remote switching circuitry, termed remote line concentrator circuitry, the connections to the central office may be reduced from the normal of one per subscriber to a number statistically determined to be sufficient to provide constant service for the total number of connected subscribers. Normaly, the line concentrator circuitry operates as a slave unit, and the assignment of paths is accomplished by some control center which may or may not be physically at the central office, controlling a number of distinct remote concentrator circuits. The remote concentrator equipment must therefore be connected by signaling paths to the control center and must include circuitry for receiving and processing the directory signals from the control center indicative of the various switching and other control functions to be performed.

A number of different directory signals must be transferred between the concentrator control center and the remote switching stations of a telephone remote line concentrator switching system. Each signaling channel utilized, however, adds to the cost of equipment. To maintain this cost at a minimum, it is extremely desirable that each physically-separate signaling path and the line concentrator circuitry associated therewith be adapted to respond to the greatest number of different signals which may be placed on the signal path.

It has been determined that by utilizing signals of coded binary form the amount of information which may be transferred via a signal channel may be substantially increased. In addition, the binary number system offers certain well-known advantages with reference to the reduction in complexity of circuitry utilized for manipulating information coded on that logical base. For this reason, electronic concentrator control centers may be advantageously adapted to function on this logical base. With the switching information directly available at the control center in binary form, it is a convenient operation to transfer the binary singals to the remote concentrator for execution, especially if the remote concentrator is itself adapted to operate in response to binary information.

Remote equipment adapted to process binary-coded information is valuable for more than the foregoing reason, however. For example, binary processing circuitry is normally compact in physical dimensions and adaptable to use in a plurality of varying situations without substantial change in dimensions. Obviously, line concentrator equipment which is to be positioned remote from a central location must be of a size compatible with the housing space available at a number of varying remote locations. However, a line concentrator should also be adaptable for use in a plurality of varying subscriber situations. For example, it may be desirable to utilize remote line concentrator circuitry in one situation for servicing a number of subscribers having specific requirements whereas in another situation the same number of subscribers may have additional service requirements. Alternatively, the character of a serviced area may so change after a telephone system has been installed that the service requirements of the subscribers may be substantially increased. Since at the remote positioning area the housing of the equipment may not offer sufficient space for physical growth, it will be appreciated that circuitry used therein must be of a type having provisions for growth without appreciable increase in physical size.

The aforementioned remote line concentrator equipment utilized for transmission and control may include, specifically, circuitry for receiving the information from the control center, circuitry for controlling the scanning and detection of the conditions of the various subscriber circuits associated with the concentrator and for providing signals to the actual concentrator switching network respecting the selected line circuits, circuitry for registering the received information signals indicative of the action to be taken by the concentrator, and circuitry for processing the various link number and operation data to provide operating signals to the switching network and other circuitry for accomplishing the required switching and other functions.

It is especially desirable that the arrangement of circuitry comprising the remote line concentrator equipment possess the ability to compensate for possible errors in circuit component function. For example, should some malfunction of the control center equipment cause incomplete control signals to be directed to the remote concentrators, it is desirable that the concentrator equipment remain non-responsive and, after the completion of the appropriate signal read-in period, operate to clear the receiving circuitry so that it may receive additional signals from the control center. In other words it is desirable that the concentrator be self-clearing and non-responsive to incomplete control signals Further, for use in a remote concentrator each component circuit should meet certain requirements. Obviously, any circuitry which is positioned remote from a central office without the constant attendance of the maintenance personnel available thereat must be constructed of reliable and proven components arranged in trustworthy component circuits. It is therefore desirable that such remote circuitry include a minimum of components and component circuits commensurate with reliable use.

In addition, in telephone systems which are electronic in nature, neither all of the subscribers nor the remote concentrator circuitry is connected to the control center by direct-current paths over which operating power may be supplied. Particularly for use with such telephone systems and, in fact, for use with any remotely positioned equipment, the provision of a sufficient supply of operating power is critical.

It is therefore an object of this invention to provide improved circuitry for receiving and processing the directory signals sent for controlling the switching operations of a remote line concentrator.

Another object of this invention is to provide improved line concentrator circuitry adapted to process information presented via a minimum number of signaling channels.

An additional object of this invention is to provide improved line concentrator control circuitry capable of providing service to a predetermined number of subscribers having varying service requirements.

Another object of this invention is to increase the capabilities of line concentrator circuitry while maintaining the size thereof relatively constant.

A further object of this invention is to provide a self-clearing line concentrator which will react only in response to complete signals from a control center station.

It is another object of this invention to increase the reliability of line concentrator control circuitry.

A further object of this invention is to reduce the electrical energy required for the control of the switching and receiving functions in a remote line concentrator.

Briefly, the foregoing objects are accomplished in accordance with aspects of this invention by line concentrator control circuitry which is adapted to operate in response to binary-coded information. The circuitry includes a bi-polar receiver for receiving pulses from the concentrator control center via a single signaling channel indicative of both order (the action to be taken and the appropriate link to be utilized) and advance (the appropriate subscriber line as determined by sequential scanning and detection) information, a binary-coded shift register circuit (herein designated a link-number register) for registering the received order information, a ring counter circuit (herein designated a scan control counter) for controlling the sequential scanning, detection, and seizure of the appropriate associated subscriber line circuits in response to the received advance information, and various other circuitry for interconnecting and controlling the operation of the aforementioned component circuits.

A feature of this invention relates to the use of a two-channel, bipolar receiver at a remote line concentrator for receiving both order and advance information intermixed on a single signaling channel from a control center. The utilization of this circuitry increases the amount of information which may be propagated via a single physical signaling path thereby effecting a substantial saving in outside plant equipment cost.

Another feature of this invention relates to the use of remote line concentrator component circuits adapted to function in response to binary information. The use of such circuits provides that physical circuit size may be reduced while potential call-handling capabilities are increased without substantial physical growth.

For example, a more specific feature of this invention relates to the use of a binary-coded shift register for recording orders directed to the concentrator. By utilizing a binary-coded register for recording the order information including the link number, the number of links which may be made available to the subscriber line circuits associated with a remote concentrator may be substantially increased with little increase in the internal component control circuitry and with no increase in the external physical dimensions of the structure housing that circuitry. For example, the number of links which may be made available to a given number of subscribers may be doubled by the simple addition to the control circuitry of but a single memory stage in the link number register.

Additional features of this invention include the logical arrangement of the remote concentrator circuitry whereby operation in response to binary information is rendered feasible. As will be explained hereinafter, though binary pulses indicative of both order and advance information may be identical in form and received via the same receiving channel, means are provided for precluding any interference therebetween. For example, a bistable circuit is provided which is responsive to the first of a group of received order pulses to disable the line scanning counter during the order receipt period. Thus, the order pulses following the first may be of a polarity normally appropriate to advance the counter without accomplishing that purpose. In addition, this disabling circuit operates as a line selection device by interrupting the scanning sequence of the counter at the appropriate line circuit during the receipt of an order pertaining thereto.

It is another feature of this invention that resetting means be arranged in a manner to be responsive to the complete receipt of an order by the link number register for resetting the concentrator control circuitry for receiving additional orders and that executing means comprise, in one specific embodiment, a monostable circuit operative for an extremely short duration less than the interval between advancing pulses. In this manner, as will be illustrated, the concentrator control circuitry is rendered self-clearing upon the receipt of any order, and an incomplete signal in binary form is cleared without execution.

An additional feature of this invention relates to the use of various asymmetrical memory stages and low power transistor circuits throughout the remote concentrator control circuitry whereby the amount of energy dissipated in the remote line concentrator is substantially limited.

These and other objects and features of this invention will be better understood upon consideration of the following detailed description and the accompanying drawing in which.

GENERAL CIRCUIT DESCRIPTION AND OPERATION

Figure 1:
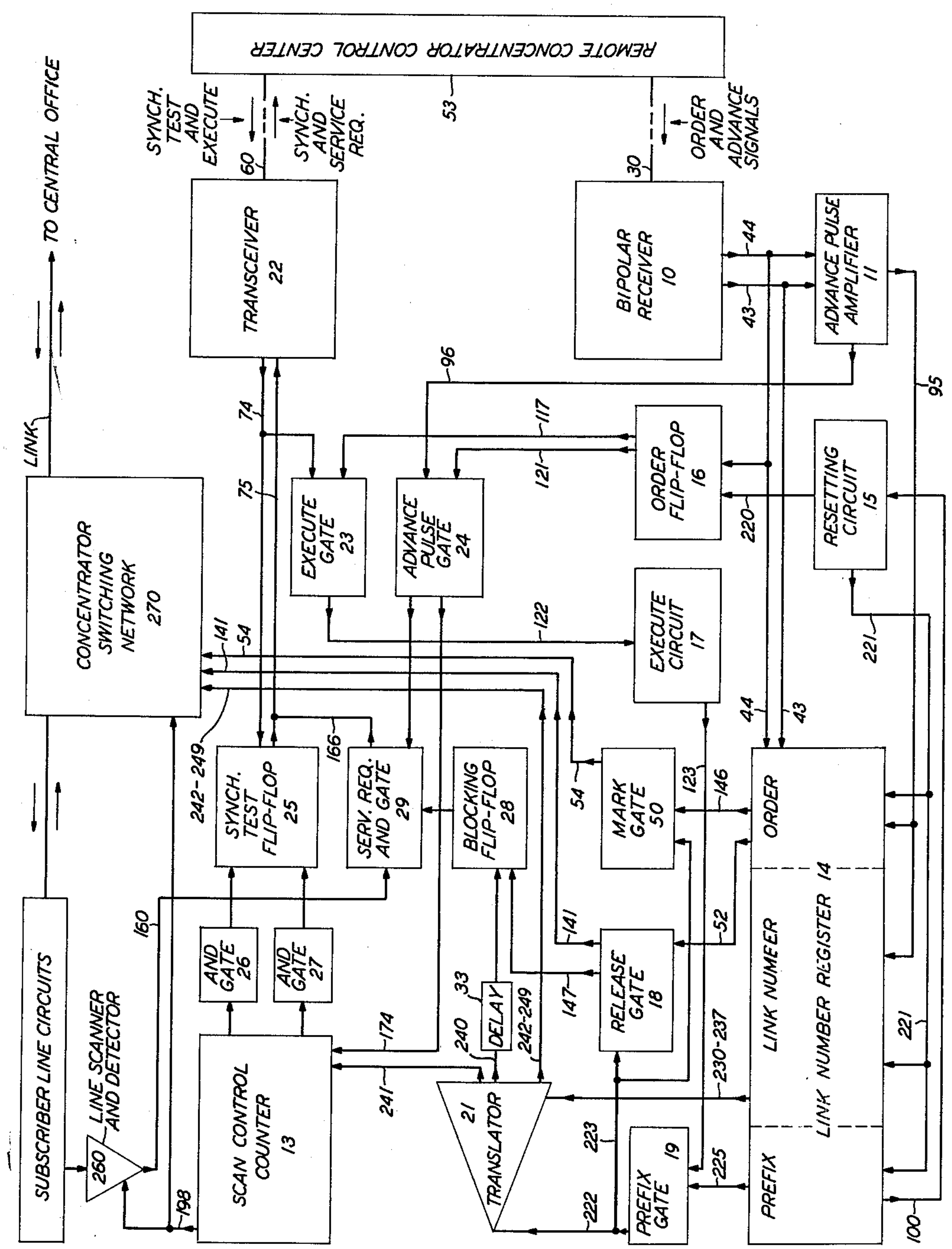
FIG. 1 is a block diagram representative of the logical arrangement of the remote line concentrator control and receiving circuitry.

Referring now to FIG. 1, there is shown in block diagram form the component circuits of this invention for controlling the operation of a remote line concentrator. The main components of the control circuitry include a scan control counter 13 for controlling the scanning and seizure of the appropriate ones of the subscriber line circuit, a link number register 14 for recording the information indicative of the appropriate links and actions (the order information), a bipolar receiver 10 for receiving the signals indicative of both advance and order information, and various other associated circuitry. The advance and order input signals are received by the bipolar receiver 10 over a signaling channel 30 from a concentrator control center 53 which may reside physically with the central office equipment or, in systems utilizing secondary stages of concentration, in a position remote from the central office associated with a number of primary concentrator circuits.

The pulses sent to the remote concentrator via the channel 30 are of a first and a second polarity but otherwise identical in form and value. The bipolar receiver 10 comprises a first channel which operates in response to each input pulse of the first polarity to amplify and produce an output signal on a first output conductor 43, and a second channel which operates in response to each input pulse of the second polarity to amplify and produce an output signal on a second output conductor 44. The receiver 10 also comprises internal feedback circuitry which operates responsive to output on either conductor 43 or 44 to preclude the operation of both receiving channel for a period sufficient to allow spurious overshoot to take place without affecting the receiver 10 or the operation of the concentrator circuitry. The feedback circuitry is advantageously adapted to accomplish the preclusion for an interval sufficient to eliminate overshoot pulses without precluding succeeding information signals.

The counter 13 is advantageously of such a configuration, as will be more fully explained hereinafter, that it is operated by each of a timed sequence of identical pulses. The pulses received by the bipolar receiver for advancing the counter 3 are therefore of a first polarity only, operate only one channel of the receiver 10, and appear on the output conductor 43 only. Order information, on the other hand, must indicate the varying actions to be taken by the concentrator. The order pulses are therefore binary in character, varying between pulses of the first polarity which operate the first channel to produce output pulses on the conductor 43 and pulses of the second polarity which operate the second channel to produce output pulses on the conductor 44. Thus it will be noted that the single signaling channel 30 carries the substantially-constantly-transferred advance pulses, identical order pulses, and order pulses of an opposite polarity.

To reduce power consumption in the concentrator, it is desirable that circuitry which is operated only incidental to an order operation remain in the nonconductive condition except during the actual receipt or execution of an order by the concentrator. In addition, to allow the use of identical pulses for both advance and order information from the same channel 30, it is necessary to disable the advance-pulse-responsive equipment during receipt of order information. Since all pulses appearing on the conductor 44 are necessarily order pulses, each order signal is prefaced or prefixed with a pulse of a polarity to provide output on the conductor 44 and the order responsive circuitry is connected to operate in response to prefix pulses. In addition, circuitry including an order flip-flop 16 is also adapted to operate responsive to prefix pulses for precluding any advance actions. In this manner a substantial portion of the order responsive circuitry remains dormant until an order is actually received at which time this circuitry becomes operative and the advance circuitry is disabled; power consumption is thus cut to a minimum while binary signaling over the single channel 30 is facilitated.

The pulses appearing on both conductors 43 and 44 are transferred to an advance pulse amplifier 11. Amplified pulses of advance polarity are transferred therefrom via a conductor 96 to an advance pulse gate 24 for advancing the scan control counter 13. The advance pulse amplifier 11 comprises, basically, a high impedance input amplifying stage, an OR gate stage, and an output amplifier stage. The input pulses received on the conductor 43 are amplified and transferred directly to the advance pulse gate 24, while the input pulses from both conductors 43 and 44 are amplified and transferred by the OR gate stage to operate the output stage for providing pulses on a conductor 95 for shifting the link number register 14, as will be explained hereinafter.

Because the scan control counter 13 must remain in control of a selected line circuit during the receipt and execution of an order respecting that line circuit, only actual advance pulses may be transferred to the counter 13 by the advance pulse gate 24. To accomplish this purpose, the advance pulse gate 24 includes a first gating stage. This stage receives the pulses of advance polarity from the advance pulse amplifier 11 and is gated by an input transferred from the order flip-flop 16 for precluding the transfer of the advance polarity pulses during the period in which an order signal is being received from the concentrator control center 53. The advance pulse gate 24 thus transfers all advance pulses to operate the scan control counter 13 and precludes all order pulses of advance polarity from operating the counter 13.

To accomplish the foregoing result, each pulse appearing on the conductor 44 is transferred to the order flip-flop 16 to accomplish the setting thereof. Since each order is initiated by a prefix pulse on the conductor 44, the flip-flop 16 is set in response to each order initiation. The circuit 16 is a bistable multivibrator adapted to provide an output potential in the set condition for disabling the advance pulse gate 24. A second output is also taken from the order flip-flop 16 during the set condition thereof to enable an execute gate 23, the operation of which will be explained hereinafter. As will be explained hereinafter, the order flip-flop 16 is reset and precluding potential removed from the gate 24 upon the completion of each order.

The advance pulses are amplified and delayed by an output stage of the advance pulse gate 24 before transfer to the counter 13 via a conductor 174. The scan control counter 13 includes a plurality of stages, the number thereof being adequate to provide a distinct output to control each of the associated subscriber circuits in sequence. For example, the counter 13 may include a first unit level of ten memory stages interconnected in ring counter form to count each advance pulse applied to the counter 13. The counter 13 may additionally include a second decimal level of six memory stages interconnected in ring counter form to operate responsive to the operation of the first of the unit stages only thereby to count each ten pulses to the counter 13. In such an exemplary counter 13 the unit level stages may also have outputs connected to provide output signals to the line concentrator selection and switching network 270 for controlling the scanning of the associated links. The network 270, the associated subscriber line circuits, the line scanner and detector circuit 260, the associated links, and the remote concentrator control center 53 may advantageously take any of a number of forms known in the art. For example, such circuits are disclosed in application Serial No. 848,595 of Harr et al., filed October 26, 1959.

The counter 13 is arranged such that only two memory stages are in the set condition at any instant (one stage of each level), and each stage may be advantageously of asymmetrical form. This arrangement provides that only two stages consume power at any instant thereby reducing the power utilized by the concentrator in accordance with a primary object of this invention. In addition, each memory stage includes feedback means for resetting the preceding stage and means for conditioning the succeeding stage to function in response to a next input pulse. Means are also provided for resetting the counter stages to a predetermined condition in response to a resynchronizing pulse transferred from a translator 21 via a conductor 241 and originated at the concentrator control center 53.

As the counter 13 is advanced through each decimal condition, distinctive sets of output signals are provided on output conductors 198. These signals are transferred to the line scanner and detector circuit 260 where they control the sequential interrogation of the line circuits, as explained in the aforementioned Harr et al., application. When a supervisory signal such as a service request is present upon the interrogation of a subscriber line circuit, a predetermined signal is transferred from the detector 260 via a conductor 160 to a service request AND gate 29 for further transfer via the transceiver 22 to the control center 53, as will be explained more completely hereinafter. When the request signals are received at the control center 53, the operation for the assignment of a link to the appropriate subscriber circuit is initiated culminating in a switching order directed to the concentrator. When the order is received and executed by the concentrator, the output signals on the conductors 198 furnish signals to the network 270 which determine the appropriate line with respect to which the order is to be taken.

The signals on both of the conductors 43 and 44 are also transferred to the first or input memory stage of the link number register 14. The register 14 is a binary-coded shift register which comprises a number of memory stages serially connected in a manner such that a shift pulse from the advance pulse amplifier 11 operates to advance the condition of each memory stage to the next succeeding stage. Each stage comprises a symmetrical bistable circuit. Temporary interstage memory means are connected to opposite outputs of each stage for providing double rail input to the next stage. The complete register 14 comprises an output or prefix stage the setting of which in response to the shifting of a prefix pulse thereto actuates the succeeding order-responsive circuitry, a number of intermediate stages for recording the link number or control order in binary form, and an input or order stage for recording upon complete order read-in the operation to be taken (mark or release).

Connected at the output of the prefix stage of the link number register 14 is a resetting circuit 15. This circuit 15 receives an operating potential on a conductor 100 from the prefix stage when the complete order has been read into the register so that the prefix stage is set. The resetting circuit 15 provides pulses for resetting the order flip-flop 16 and the shift register 14. The circuit 15 includes a first-stage delay amplifier and a second-stage amplifier. The delay allows the switching network 270 to complete the action ordered before control circuit resetting so that transient register conditions will not affect the action, and, further, allows for the late receipt of execute pulses and the attendant operation in response thereto before accomplishing the resetting of the register 14.

As explained hereinbefore, the prefix stage of the register 14 is placed in the set condition when the prefix pulse of the order has been shifted to set that stage. Since the register 14 has just sufficient stages to register the complete order including the prefix pulse, the link number, and the action to be taken, this setting or the prefix stage normally occurs as the complete order is read into the register 14. Thus the resetting of the register 14 and the order flip-flop 16 (which precludes the advance of the counter 13) is acomplished automatically upon the complete read in of the order, thereby rendering the register 14 and the concentrator self-clearing.

In addition, however, it will be noted that orders which are incomplete due to a malfunction of the control center equipment will also be cleared from the register 14. Assuming that an order from which one bit of information is missing has been read into the register 14, the prefix pulse will not have been advanced to set the prefix stage but will be in the preceding stage and the resetting function will not be initiated. The next pulse transferred to the concentrator via the channel 30 is an advance pulse. As pointed out supra, each pulse of either advance or opposite polarity operates the advance pulse amplifier 11 to produce a shift pulse for shifting the register 14. Thus the advance pulse following the incomplete order shifts the register such that the prefix stage thereof is set, and the resetting circuit 15 operates to clear the register 14 and the order flip-flop 16. For reasons which will be noted hereinafter, the incomplete order is incapable of effecting a switching of the concentrator network 270.

It is desirable where, as is the usual case, a number of line concentrators are controlled from a single control center 53 that the same order be directed to all of the concentrators but executed only at the desired concentrator. In this manner the signaling channel complication may be minimized, wire cost reduced, and major component duplication within the control center 53 eliminated. In such a system, an execute signal must be sent to the concentrator at which the operation is to be accomplished, and circuitry must be included in each concentrator to accomplish the execution of the order.

Our invention utilizes a receiving section of a transceiver 22 for receiving the execute signal from the control center 53 via a signaling channel 60. A monostable execute circuit 17 is operated by the output of the transceiver 22 upon the enabling of an execute gate 23 by the order flip-flop 16. The execute circuit 17 provides a signal for a predetermined period to enable a prefix gate 19 which transfers the set condition of the prefix stage of the link number register 14 to operate the translator 21 for reading out the order.

The transceiver 22 has a first channel substantially identical to those of the bipolar receiver 10 for receiving the execute pulses, a precluding circuit identical to the feedback circuit of the bipolar receiver 10, and a transmitting channel. The precluding circuit, however, operates in response to pulses transmitted from the concentrator to preclude the receipt of pulses and eliminate transmission-pulse feedback into the concentrator.

Included between the receiver portion of the transceiver 22 and the execute circuit 17 is the execute AND gate 23. The gate 23 is enabled by an output of the "set" order flip-flop 16 to transfer the execut pulse for operating the execute circuit 17. The use of the AND gate 23 allows pulses identical to execute pulses appearing on the channel 60 to be utilized for testing the synchronization of the scan counter 13 without effecting concentrator execution, as will be explained hereinafter. In this manner, two distinct information signals may be propagated via the channel 60, effectively reducing the necessary signaling channels.

The execute circuit 17 is a relaxation oscillator which provides an output signal on a lead 123 in response to the execute pulse from the transceiver 22 via the gate 23. The circuit is adapted to provide an output for a period less than that encompassing two advance pulses. The output furnished thereby enables the aforementioned prefix gate 19 for a period sufficient for transfer of an enabling signal to the translator 21 for initiating the read-out of the order in the register 14.

The prefix gate 19 is connected at an output of the prefix stage of the link number register 14. The gate 19 includes a first gating stage operative responsive to the execute condition of the execute circuit 17 and the set output of the prefix stage of the register 14 to transfer a signal via a second stage to the translator 21. The receipt of this signal causes the translator 21 to readout the conditions present in the intermediate link number stages of the register 14 via the conductors 230–237 for the translation and use thereof.

As will be more completely explained hereinafter, the execute pulse is transferred to the concentrator substantially coincidentally with the last pulse of an order group. The duration of the operation of the execute monostable circuit 17 is such as to enable the read-out of the register 14 before the next advance pulse appears. With respect to the incomplete order groups mentioned supra, it will be noted that execution takes place before the prefix stage can be set and is completed before a succeeding advance pulse can cause that setting. Since the setting of the prefix stage controls the operation of the prefix gate 19 whereby translator read-out is accomplished, the incomplete order cannot be read out and executed.

The translator 21 may comprise any of a number of well-known circuits for translating an input signal appearing in binary form into a one of a number of distinct decimal output signals. For example, the translator 21 may comprise one of the well-known transistor "tree" circuits or another type of binary-to-decimal converter. Each decimal output signal of the translator 21 is transferred via a conductor, such as conductors 242–249, for apprising the switching network 270 of the link to the central office to be controlled, or via other conductors, for example 240 and 241, for accomplishing one of the service functions, to be explained hereinafter, at the concentrator. In addition, the output of the order stage of the register 14 is directed to the network 270 for determining the action to be taken thereat.

Whether or not an execute pulse is addressed to the concentrator after an order has been read into the register 14, the shift register reset circuit 15 is pulsed and provides pulses for rsetting the order flip-flop 16 and the shift register 14. In this manner, the disabling potential at the advance pulse gate 24 is removed and the register 14 is prepared for receipt of additional order signals. It is to be here noted that for certain uses the execute monostable circuit 17 may be replaced with a bistable flip-flop identical to that of the order flip-flop 16. In such a case, the resetting pulse is also directed to reset the execute circuit 17 thereby to remove enabling potential from the prefix gate 19.

The logical arrangement of this invention is provided with circuitry for testing the synchronization of the scan control counter 13 with the control center scanning circuitry. This testing circuitry includes a synchronization test flip-flop 25. The flip-flop 25 is substantially identical to the stages of the scan counter 13 and is adapted to conduct only during the testing condition thereof. The coincidence of signals representing the setting of the last stage of each level of the counter 13 enables an AND gate 26 to furnish a pulse to the flip-flop 25. When this last-mentioned pulse coincides with an execute pulse received at the receiver portion of the transceiver 22, the test flip-flop 25 is set. The subsequent setting of the first stage of each level of the counter 13 on receipt of an advance pulse thereat enables a second AND gate 27 to provide a resetting pulse for the flip-flop 25. The resetting of the flip-flop 25 provides an output pulse which is transferred by a conductor 75 to the transmitter portion of the transceiver 22 and thence to the control center 53 where it may be resolved as indicating proper synchronization.

Should no synchronization pulse be received by the comparing equipment of the control center 53, a determination is made that the concentrator counter 13 is out of synchronization with the master scan equipment and an order is directed to the concentrator which (upon being processed in the manner explained hereinbefore for order signals) produces an output upon the conductor 241 from the translator 21 for resetting and synchronizing the stages of the counter 13.

The logical arrangement of this invention also includes a service request blocking flip-flop 28 which operates to block the transmission of signals from the concentrator to the control center 53 when all of the links connected to that concentrator are in use. In such a case, no additional links can be assigned by the control center 53, so the service request pulses simply burden the control equipment and are, therefore, undesirable. The service request blocking circuitry includes a flip-flop 28 which is set on the receipt of a signal via a delay circuit 33 from the translator 21 sent to the register 14 as an order from the control center 53. The flip-flop 28, when set, applies a signal to block the transmission of service request pulses from the detector 260 to the transceiver 22. Blocking is accomplished by the removal of an enabling pulses required for transmission by a service request AND gate 29 of the service request signals.

The blocking flip-flop 28 may comprise an asymmetrical memory circuit much like the stages of the counter 13. Once the flip-flop 28 has been set, the release of a link connected to that concentrator enables a release gate 18 to transfer a resetting pulse to the flip-flop 28 thereby enabling the service request AND gate 29. Service request pulses are then transferred by the gate 29 for transmission by the transmitter of the transceiver 22.

SPECIFIC CIRCUIT DESCRIPTION

*Bipolar Receiver*

Figures 2, 5:
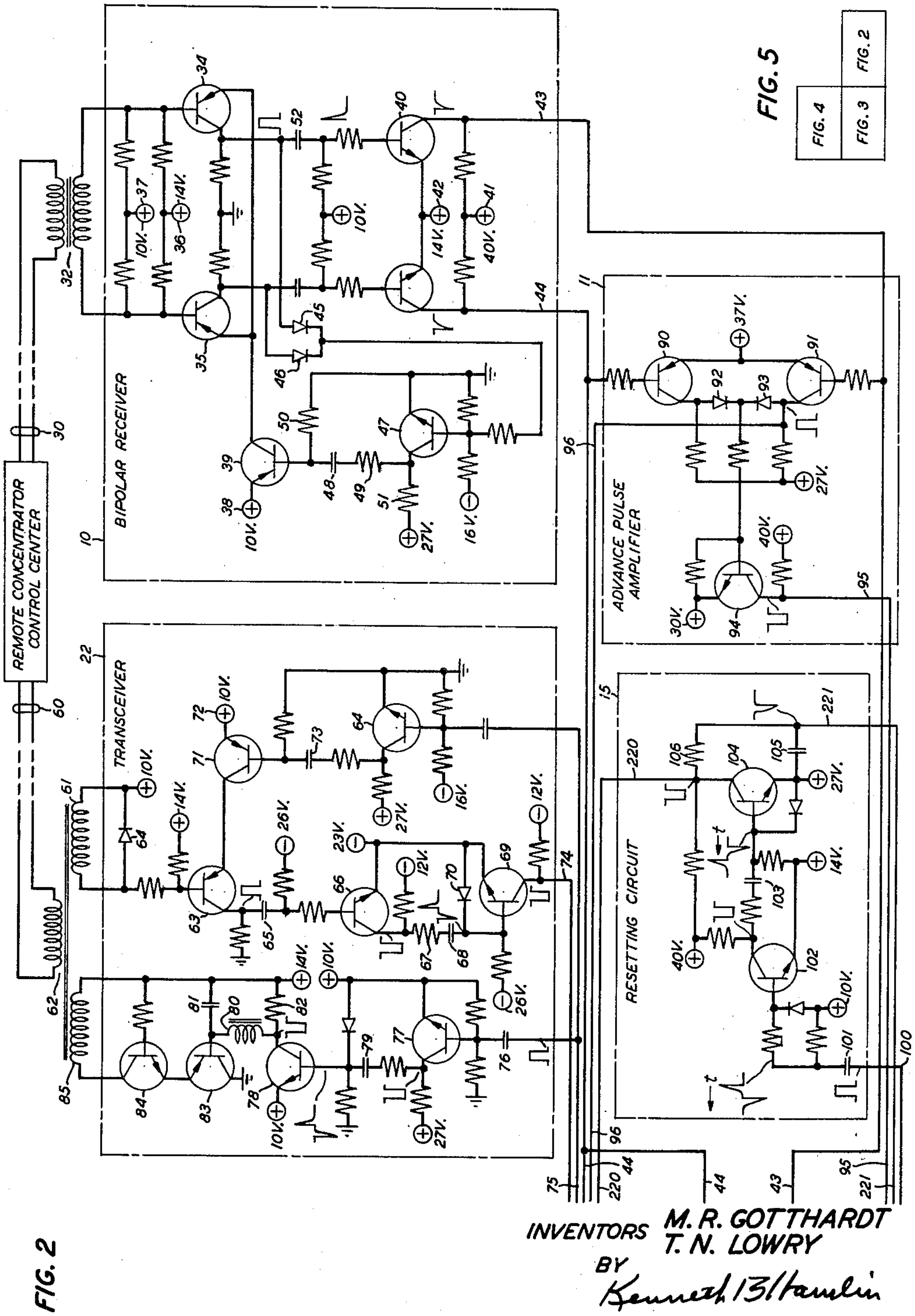
FIG. 2 is a schematic representation of a portion of the control circuitry of the remote line concentrator shown in block form in FIG. 1.
FIG. 5 is a diagram illustrating the arrangement of drawing sheets including the specific circuitry.

Referring now to FIG. 2, there is shown in schematic form the specific elements of a portion of the component circuitry of the invention more generally disclosed in FIG. 1, supra. The bipolar receiver 10 comprises first and second receiving channels which operate in response to order and advance signals received over the transmission channel 30 from the remote concentrator control center 53. The receiver 10 also comprises inhibiting circuitry which operates in response to the transmission of a received control pulse by either of the aforementioned channels for precluding the receipt of additional control pulses by either of the channels for a period sufficient to eliminate receiver response to spurious transformer-induced overshoot pulses.

The order and advance signals received from the remote concentrator control circuitry 53 via the transmission channel 30 are of a first or a second polarity depending on the function to be accomplished. For example, as explained supra, order pulses are of both polarities and are received on both channels. Advance signals received on the transmission channel 30, on the other hand, are of a single polarity such as to provide a negative pulse upon transfer by a transformer 32 at the base of a transistor 34 of the first receiver channel. The p-n-p junction transistor 34 is advantageously biased to saturate upon the receipt of a sufficient negative pulse, the required input pulse being such as to eliminate operation in response to noise on channel 30. Pulses of the opposite polarity are incapable of operating the transistor 34 but saturate a p-n-p junction transistor 35, biased in a like manner, to provide for operation of the second receiver channel.

As explained, each of the input transistors 34 and 35 is biased to be nonconductive until an input pulse is received. This is accomplished by grounding the collectors of each transistor 34 and 35 while applying positive battery from sources 36 and 37 to the bases and a lower positive potential at the emitters thereof from a source 38 via a saturated transistor 39 of the inhibiting circuitry. The resistors forming the voltage divider arrangements connecting the sources 36 and 37 to the bases of the transistors 34 and 35 may advantageously be such as to provide an input resistance to match the real part of the characteristic impedance of the transmission path 30 upon the operation of either channel.

Since both receiving channels are identical and produce identical output signals, a single channel will be described. When a pulse is received from the transmission channel 30 of appropriate polarity to reduce the potential at the base of the transistor 34 below that furnished at the emitter by the source 38, the transistor 34 saturates. This saturation produces a positive-going pulse at the collector of the transistor 34. The positive pulse is coupled to the base of a normally-off transistor 40 by a coupling capacitor 52. The capacitor 52 may be of a value such as to differentiate the transferred pulse thereby to provide identical inputs to the transistor 40 even though the inputs from the channel 30 may vary to some extent.

The transistor 40 may advantageously be of the n-p-n junction type and is biased to saturate upon receipt of the positive input pulse and provide a sharp negative output pulse at the collector thereof. The negative output pulse is transferred by the conductor 43 to operate the shift pulse amplifier 11, and the link number register 14 in a manner to be explained hereinafter.

An identical pulse received on the channel 30 but of opposite polarity operates the input transistor 35 and the circuitry associated therewith to produce an identical negative output pulse on a conductor 44 for transfer to the shift pulse amplifier 11, the link number register 14. and the order flip-flop 16.

To provide overshoot inhibition the positive pulses furnished by the saturation of the input transistors 34 and 35 are transferred by decoupling diodes 45 and 46 to the base of a normally-off transistor 47. The transistor 47 may advantageously be of the n-p-n junction type and is biased such that the positive pulses applied at the base thereof accomplish saturation and provide a low-impedance, quick-charging path for a capacitor 48. The capacitor 48 is connected at the base of the p-n-p inhibiting transistor 39. Since the transistor 39 is biased to be normally conductive, the negative pulse applied on the saturation of the transistor 47 has no effect on the transistor 39 except to increase the current flow to the "on" input transistor 34 or 35 thereby assuring its continuance in saturation. Thus, during the period in which the input pulse from the channel 30 is applied to one of the transistors 34 or 35, the transistor 39 remains conductive, and no inhibiting is accomplished.

However, as the input pulse supplied by the transmission line 30 terminates and the appropriate input transistor 34 or 35 ceases to conduct, a negative-going potential is applied at the base to turn off the transistor 47. As the transistor 47 is rendered non-conductive, a substantial positive pulse is produced at the collector thereof and transferred to the base of the inhibiting transistor 39. The positive pulse causes the transistor 39 to cease conduction, removing the biasing potential furnished by the source 38 from the emitters of both transistors 34 and 35. The removal of biasing potential at the emitters of the transistors 34 and 35 precludes further operation of those transistors 34 and 35 and eliminates the harmful effect of transformer overshoot. The inhibition of transistor 39 is maintained until the capacitor 48 is charged to a value sufficient to remove inhibiting potential from the base of the transistor 39. The time of this inhibition may be appropriately adjusted by the choice of the capacitor 48 and the resistors 49, 50, and 51 to be sufficient to eliminate transformer overshoot capable of operating either of the input channels without interfering with the control pulses appearing on the signaling channel 30.

*Advance Pulse Amplifier*

The advance pulse amplifier 11, shown within dashed lines in FIG. 2, receives input pulses from the opposite channels of the bipolar receiver over conductors 43 and 44. The amplifier 11 includes a high impedance input amplifying stage, a diode OR gate stage, and a final output amplifying stage operating upon receipt of pulses from the OR gate to provide output which may be further utilized.

The negative pulses received on the conductors 43 and 44 are applied at the bases of two input transistors 91 and 90, respectively. Each of the input transistors 90 and 91 may advantageously be of the p-n-p junction type and is biased in the normally nonconductive condition. The application of a negative input pulse saturates the appropriate transistor 90 or 91 to produce a positive-going pulse at the collector thereof which is coupled by an isolating diode 92 or 93 to the base of an amplifying transistor 94. Each positive pulse saturates the n-p-n junction transistor 94 to produce a negative-going pulse at the collector thereof which is transferred by a conductor 95 to provide a pulse for shifting the condition of the stages of the link number register 14, shown in detail in FIG. 3.

An additional output pulse is taken from the collector of the input transistor 91. Since the transistor 91 receives input pulses from the first channel of the bipolar receiver 10 only, the output pulses of the transistor 91 are produced only by advance polarity pulses. Each output pulse at the collector of the transistor 91 is transferred as a positive-going pulse via a conductor 96 for operating the scan control counter 13, shown in detail in FIG. 4.

*Advance Pulse Gate*

Figure 3:
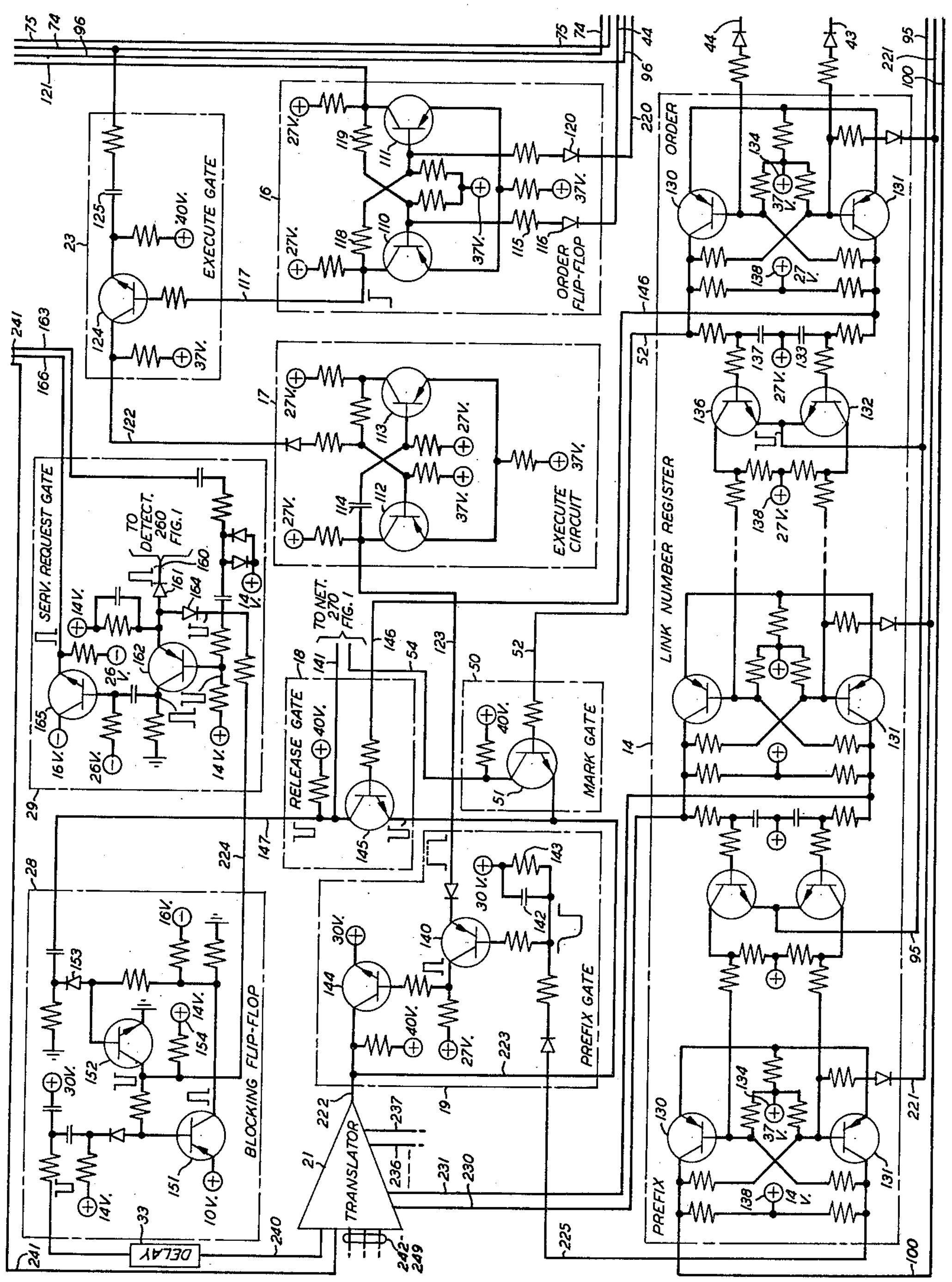
FIG. 3 is a schematic representation of another portion of the control circuitry of the remote line concentrator shown in block form in FIG. 1.
Figure 4:
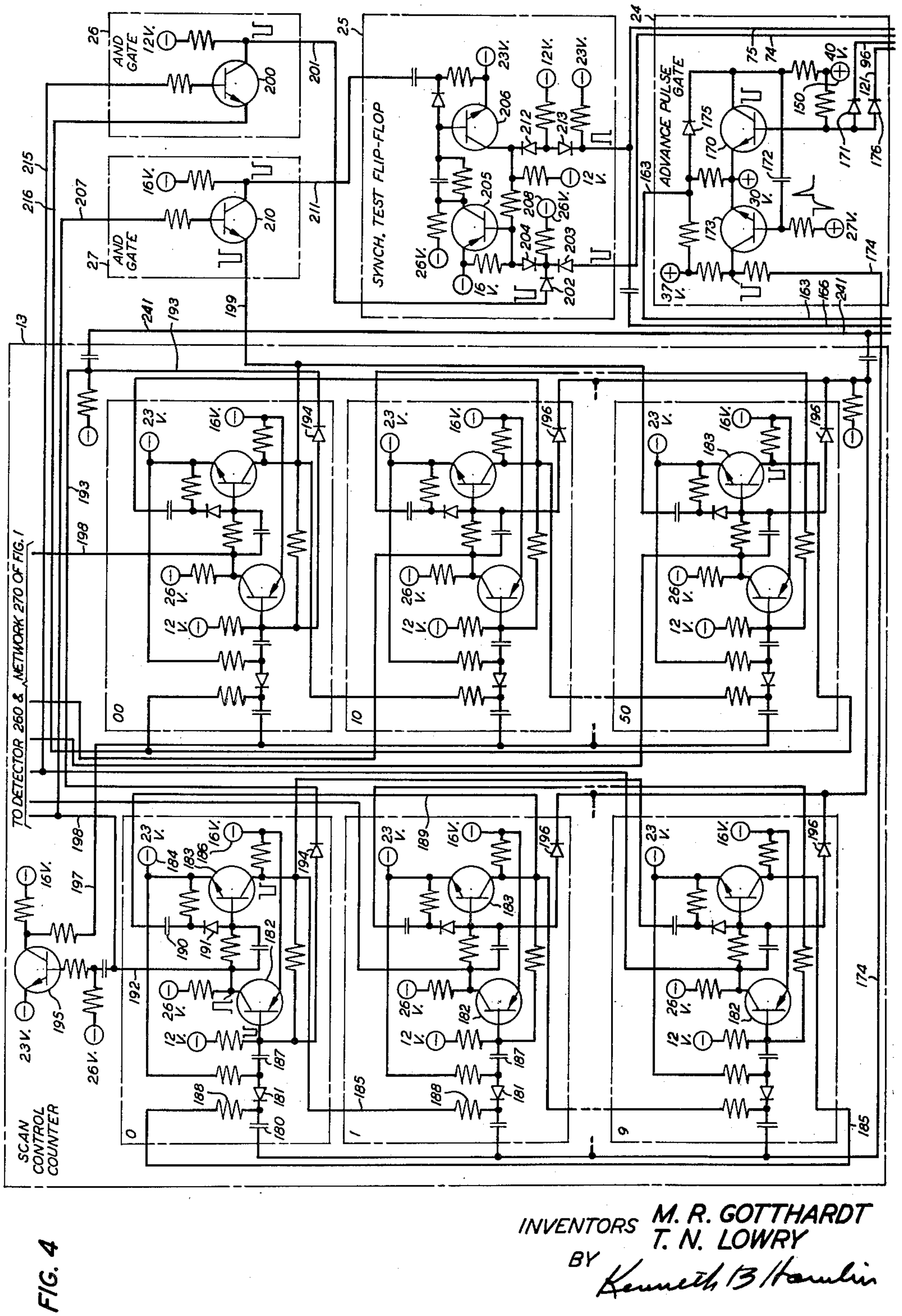
FIG. 4 is a schematic representation of a third portion of the control circuitry of the remote line concentrator described in block form in FIG. 1.

The advance pulse gate 24, shown in FIG. 4, includes a first gating transistor 170 which may advantageously be of the n-p-n junction type and is biased in the normally-off condition. The transistor 170 receives an input in the form of a positive-going pulse from the advance pulse amplifier 11 via the conductor 96 and a diode 171. In the absence of a clamping voltage applied via a diode 176, as will be explained hereinafter, the positive input pulse reverse biases the diode 171 so that the potential furnished by the source 150 at the base of the transistor 170 produces saturation. Saturation of the transistor 170 produces a negative pulse at the collector of the transistor 170 which is coupled by a capacitor 172, having a relatively-short time constant, to the base of a n-p-n junction transistor 173, biased in the normally-off condition. The capacitor 172 acts to differentiate the pulse applied at the base of the transistor 173 to produce a first negative-going and a second positive-going voltage spike. Because negative pulses can have no effect on the off transistor 173, a delay equal to the width of the advance pulse from the amplifier 11 is introduced before the positive-going spike saturates the transistor 173 to provide a negative-going output pulse therefrom. The delayed output pulse is transferred by a conductor 174 to operate the scan control counter 13, as will be explained hereinafter. An additional output is taken at the collector of the transistor 170 via a diode 175 and a conductor 163 to enable the service request gate 29, shown in detail in FIG. 3.

When, however, an order signal is being received and the counter 13 must remain in control of a predetermined line circuit, a negative input level is provided via a conductor 121 and the input diode 176 to clamp the base of the transistor 170 below operating level so that advance pulses will not be transferred thereby. This negative level is provided at the collector of a transistor 111 of the order flip-flop 16, shown in detail in FIG. 3, when that circuit is placed in the set condition, as will be explained hereinafter.

*Scan Control Counter*

The scan control counter 13, shown in FIG. 4, may be of ring counter form and includes a first unit level comprising ten stages and a second decimal level comprising a number of stages sufficient to service a predetermined number of subscribers, for example, six memory stages. The output of each memory stage is connected to the line scanner and detector 260 and to the concentrator network 27 for controlling the specific lines serviced by that remote line concentrator network.

Each of the memory stages comprises a first p-n-p transistor 182 and a second-n-p-n transistor 183, which may be advantageously arranged to provide a bistable memory cell of asymmetrical form. The asymmetrical form provides that both of the transistors 182 and 183 are conductive or non-conductive coincidentally. Since the counter 13 is of the ring form wherein only one memory stage of each level is On at one time, only two stages will be consuming power at any one time thereby effecting a substantial reduction in power consumption.

A negative input pulse from the advance pulse gate 24 is transferred to an input capacitor 180 of each of the unit level stages of the counter by the conductor 174. An input diode 181 is connected in each stage to the coupling capacitor 180 and is arranged to be biased by a voltage indicative of the condition of the preceding stage for transmission or nontransmission of the input pulse. When a memory stage of the counter is in the set or On condition a negative potential furnished by a source 184 is transferred through the saturated transistor 183 and via a conductor 185 to bias the diode 181 of the succeeding stage for the transfer of the input pulse. On the other hand, when a memory stage is in the reset condition a more positive potential is provided by a source 186 for biasing the input diode 181 of the succeeding stage to be nonconductive to advance input pulses. Since only one memory stage of each level is conductive at a given time, only the succeeding stage will be placed in the set condition by an advance pulse.

Referring to the unit level of the counter 13, it will be assumed for illustration that the "0" stage is conductive preceding the receipt of an advance pulse. The input diode 181 of the "1" stage is then biased to conduct the next advance pulse. This next pulse is transferred and is applied by a capacitor 187 to the base of the normally-off p-n-p junction transistor 182. The transistor 182 saturates, raising the potential level at the collector thereof and at the base of the transistor 183. The positive potential at the base saturates the transistor 183 causing the collector thereof to fall to the potential furnished by the source 184. This collector potential is fed back to the base of the transistor 182 to stabilize the memory stage in the set condition.

The input capacitor 180 and a resistor 188 are advantageously adapted to provide a time constant for the capacitor 180 which is long with respect to the time required for the memory stage to stabilize in the On condition. In this manner the capacitor 180 will not charge and remove the input pulse until the stability of turn-on has been assured.

As the stage "1" of the unit level turns on, the collector of the transistor 183 thereof displays a negative-going potential which is coupled to the base of the transistor 183 of the preceding stage via a conductor 189. The negative pulse is applied by a capacitor 190 and a diode 191 at the base and turns off the transistor 183. The resulting positive voltage increase at the collector of the transistor 183 is directed to turn off the transistor 182 and reset the "0" stage.

As the counter 13 advances to a condition where the "0" stage is placed in the set condition, a pulse is taken at the collector of the transistor 182 of that "0" stage to advance the decimal level. This positive pulse is transferred by a conductor 192 to n-p-n junction transistor 195, arranged as an amplifier to apply a negative pulse via a conductor 197 to the input capacitors 180 of all stages of the decimal level for setting the stage thereof having the correctly conditioned input diode 181 to advance the decimal level.

Additionally, circuitry is provided for resetting all of the stages to resynchronize the counter 13. A negative input pulse is transferred from the translator 21 by a conductor 241. The pulse is applied by conductors 193 and diodes 194 to operate the transistors 182 of the first stages of each level and by diodes 196 to disable the transistors 183 of all other stages. The negative pulse at the base of the transistors 182 of each first stage sets those stages, while the negative pulses at the base of the transistors 183 resets all other stages to place the counter 13 in the "0–00" condition.

*Transceiver Circuit*

The transceiver circuit 22, shown in FIG. 2, comprises a receiving channel, a transmitting channel, and inhibiting circuitry. Execute pulses and synchronizing pulses of a single polarity are received from the control center over a signaling channel 60 and applied by a secondary winding 61 of a transformer 62 at the base of a normally-off p-n-p junction transistor 63. The input transistor 63 is advantageously biased to be saturated by the negative-going input pulses.

The receiving channel of the transceiver 22 is substantially like those of the receiver 10. The saturation of the transistor 63 produces a positive output pulse at the collector thereof which is coupled by a differentiating capacitor 65 to the base of a normally-off p-n-p junction transistor 66. The transistor 66 saturates, providing a negative-going output pulse. This negative pulse is applied by a resistor 67 and a differentiating capacitor 68 to the base of a normally-off n-p-n junction transistor 69. A diode 70 is connected between the emitter and base terminals of the transistor 69 to provide a short time constant for discharging the capacitor 68 during the advent of the negative spike which cannot operate the transistor 69. The positive spike provided by the capacitor 68 reverse biases the diode 70 and saturates the normally-off transistor 69. The saturation of the transistor 69 provides a negative output pulse at the collector terminal thereof which is transferred by a conductor 74 for appropriate utilization by the execute circuit 17 and the synchronization test flip-flop 25, as discussed further, below. It is to be noted that the arrangement including the coupling capacitor 68 and the diode 70 provides a means for delaying pulses received via the channel 60 so that a synchronization test pulse may be made to coincide with the proper position of the counter 13 for operating the flip-flop 25.

The inhibiting circuitry of the transceiver 22 is substantially identical to that of the bipolar receiver 10. The inhibiting circuitry, however, is operated by the input applied to the transmitter portion of the transceiver 22. The inhibiting circuitry includes a transistor 71 which is rendered nonconductive to preclude the receipt of pulses from the transmission channel 60 during the operation of the transmitter portion of the transceiver 22 by removing the potential of a source 72 from the receiver input transistor 63. The input pulses to the transmitter appearing on a conductor 75 are directed to a first transistor 64 which cooperates with a capacitor 73 to provide the precluding pulse for a predetermined period. The inhibiting circuitry precludes the feedback of signals from the transmitter to the receiver of the transceiver 22.

The transmitter portion of the transceiver 22 receives input pulses of a positive polarity from the conductor 75 via a coupling capacitor 76 at the base of a normally-off n-p-n junction transistor 77. Each positive input pulse operates to saturate the transistor 77 to produce a negative-going potential at the collector of the transistor 77. This negative pulse is differentiated by a capacitor 79, and the positive pulse spike thereof applied at the base to saturate a n-p-n junction transistor 78.

The saturation of the transistor 78 provides a negative pulse at the collector thereof as input to a tuned circuit including an inductor 80, a capacitor 81 and a critical-damping resistor 82. The short input pulse provided by the differentiating capacitor 79 renders the transistor 78 conductive for a period just sufficient to initiate oscillations in the tuned circuit.

As oscillations are initiated in the tuned circuit, an originally negative-going voltage pulse of sinusoidal form is furnished at the base of a p-n-p junction transistor 83. The transistor 83 amplifies the negative sinusoidal pulse applied at the base to produce an output at the emitter representative thereof. However, after a negative-going first half cycle the voltage input pulse begins to go positive decreasing the current through the transistor 83. The cut-off of the transistor 78 effectively places the damping resistor 82 in series with the tuned circuit thereby critically damping the tuned circuit so that the output at the emitter of the transistor 83 resembles a negative cosine wave. The current through the emitter of the transistor 83 is identical with the emitter current of a transistor 84 which is connected as an amplifier and provides an output to a winding 85 of the transformer 62. The cosinusoidal input to the transistor 84 is amplified and transferred to the transmission channel 60 and thence to the concentrator control center 53.

As explained hereinbefore, during the transmission of signals by the transmitter portion of the transceiver 22 to the transmission channel 60, the transistor 63 is precluded from operating by the removal of the operating potential furnished by the source 72 upon the disabling of the transistor 71.

*Synchronization Test Flip-Flop and Gates*

The outputs of the last stages ("9" and "50") of the unit and decimal levels of the counter 13 at the collectors of the transistors 182 and 183, respectively, are applied via conductors 215 and 216 as inputs to a n-p-n junction transistor 200, biased to be operated as an AND gate in circuit 26. The positive pulse at the base and the negative pulse at the emitter saturate the transistor 200 to reduce the potential at the collector thereof. This negative change in potential is transferred by a conductor 201 to an input diode 202 of the synchronization test flip-flop 25, shown in FIG. 4.

When it is desired to test the synchronization of the scan counter 13 with the associated circuitry of the control center, an execute pulse is transferred from the control center 53 to the receiver portion of the transceiver 22. The negative pulse produced by the transceiver 22 is transferred by the conductor 74 to the diode 203 of the test flip-flop 25 for removing the clamping potential applied via the diode 203 and thus enabling a diode 204. The enabling of the diode 204 allows the application of the negative potential from a source 208 to saturate an input p-n-p transistor 205 of the synchronization test flip-flop 25.

The flip-flop 25 is substantially identical to the stages of the scan counter 13. When the transistor 205 is placed in the conductive condition a positive pulse is transferred from the collector thereof to saturate a transistor 206 which provides feedback for locking the flip-flop 25 in the set condition.

As the counter 13 is stepped to the next condition, wherein the first stage of each level is set, output is taken at the collector of the transistor 182 of the "0" stage and applied over conductor 207 to the base of a n-p-n junction transistor 210. Coincidentally, the voltage at the collector of the transistor 183 of the "00" stage is applied over the conductor 199 to the emitter of the transistor 210. The transistor 210 is biased in circuit 27 to function as an AND gate and saturates, producing a negative voltage change at the collector. This change is transferred by a conductor 211 to the base of the transistor 206 to disable the synchronization test flip-flop 25. The change in potential at the collector of the transistor 206 due to the disabling thereof is coupled via a diode 212, a diode 213, and conductor 75 to cause the transmitter portion of the transceiver 22 to send a signal via the signaling channel 60 to acquaint the central office with the synchronization condition of the counter 13.

*Order Flip-Flop*

The order flip-flop 16 shown in FIG. 3 comprises a first p-n-p junction transistor 110 and a second p-n-p junction transistor 111. The transistors 110 and 111 are biased in a well-known manner such that one transistor is Off while the other one is On. Negative input pulses for setting the order flip-flop 16 are applied to the base of the transistor 110 from the bipolar receiver 10 via conductor 44, an input resistor 115, and a diode 116. Each negative setting pulse operates to saturate the transistor 110 and increase the positive voltage at the collector terminal thereof. The saturation voltage at the collector of the transistor 110 is utilized as an output signal which is transferred via a conductor 117 for conditioning the execute gate 23 and to provide a positive feedback voltage via a resistor 118 to turn off the priorly operated transistor 111. The drop in voltage produced at the collector of the transistor 111 is coupled via a resistor 119 to the base of the transistor 110 to provide a fast turn-on and stabilize the condition of the flip-flop 16. The lower positive potential at the collector of the transistor 111 is also transferred via a conductor 121 for disabling the advance pulse gate 24, as mentioned hereinbefore.

On the other hand, a negative resetting pulse from the resetting circuit 15 via a conductor 220 and an input diode 120 saturates the transistor 111 and by appropriate feedback turns off the transistor 110 to reset the order flip-flop 16. This resetting removes the disabling output applied via the conductor 121 to the advance gate 24 and the enabling potential applied via the conductor 117 to the execute gate 23.

Though not shown in the figures, in one embodiment the execute flip-flop 17 may be substantially identical to the order flip-flop 17 and operate in an identical manner utilizing identical components. Input thereof for resetting would be provided by the resetting circuit 15 via the conductor 220 while the setting input would be received in the manner shown from the execute gate 23 via a conductor 122. A single output would be taken during the set condition of the execute circuit 17 via a conductor 123 for enabling the prefix gate 19.

*Execute Gate and Execute Circuit*

The execute gate 23 shown in FIG. 3 includes a n-p-n junction transistor 124 biased in a normally-off condition. The transistor 124 receives a negative executive pulse at its emitter from the receiver of the transceiver 22 via the conductor 74 and a decoupling capacitor 125. When the order flip-flop 16 is in the set condition, a high positive voltage is applied at the base of the transistor 124 from the collector terminal of the saturated transistor 110. The negative pulse at the emitter and the positive voltage at the base cooperate to saturate the transistor 124, and the negative execute pulse is transferred via the conductor 122 to set the execute circuit 17.

The execute circuit 17, in the embodiment disclosed in FIG. 3, is a monostable relaxation oscillator of a well-known type. The circuit comprises first and second p-n-p junction transistors 112 and 113 connected in an arrangement including a timing capacitor 114. The circuit is normally in the stable condition wherein the transistor 113 is saturated and the transistor 112 is nonconductive. When, however, an execute pulse is received at the base of the transistor 112 via the conductor 122, the increased negative potential operates to saturate the transistor 112. The saturation of the transistor 112 causes an increased potential to be furnished to the base of the transistor 113 via the capacitor 114 thereby rendering that transistor 113 nonconductive for a predetermined period until the capacitor 114 has charged to a point where the increased potential is removed and the transistor 113 is again saturated.

During the saturated condition of the transistor 112, the higher positive voltage of the collector thereof is applied via the conductor 123 to supply a requisite operating pulse to the prefix gate 19. The reverting of the transistor 113 to the saturated condition after the predetermined period furnishes potential at the base of the transistor 112, rendering that transistor 112 nonconductive and removing the executing signal from the conductor 123.

*Link Number Register*

The link number register 14, shown in FIG. 3, comprises a plurality of serially-arranged bistable memory stages including an input or order stage, a number of stages sufficient to record the link number in binary form, and an output or prefix stage.

Each memory stage may comprise a first p-n-p junction transistor 130 and a second p-n-p junction transistor 131 connected and biased in a bistable flip-flop arrangement. Output may be taken for utilization at the collector terminals of each of transistors 130 and 131. An amplifying and memory arrangement including n-p-n junction transistors 136 and 132 is interposed between stages to connect the outputs of the transistors 130 and 131 of one stage to the inputs of the transistors 130 and 131, respectively, of the next succeeding stage.

The negative pulses provided on the conductors 43 and 44 by the operation of the bipolar receiver 10 are utilized as inputs for the first or order stage of register 14. When an order is received, the prefix pulse thereof appears on the conductor 44. This negative pulse is applied to the base of the transistor 130 and effects the saturation thereof. The saturation of the transistor 130 increases the potential at the collector thereof and coincidentally at the base of the transistor 131, rendering the transistor 131 nonconductive and "setting" the first stage.

The increase in voltage at the collector of the transistor 130 upon the saturation thereof supplies current for charging a capacitor 137, while the decrease in voltage at the collector of the transistor 131 eliminates the source of current available for maintaining the charge on a capacitor 133. The potentials due to the charges on the capacitors 137 and 133 are applied at the bases of the transistors 136 and 132, respectively. The transistors 132 and 136 are adapted to operate assuming sufficient base potential upon the receipt of a negative shift pulse at the emitter terminals thereof from the advance pulse amplifier 15 via the conductors 95. The charges on the capacitors 133 and 137, representative of the condition of the associated memory transistors 130 and 131, are thus utilized to enable only the interstage transistor 132 or 136 having the higher stored potential for transferring the shift pulse to place the succeeding memory stage in the appropriate condition, the prior condition of the first stage.

Assuming all memory stages are in the reset condition (the transistors 131 are all conducting), when the shift pulse on a conductor 95 and the order pulse on conductor 44 are received, the capacitor 133 of the input stage is charged to the higher enabling potential. Thus, while the transistor 130 is rendered conductive and the transistor 131 nonconductive by the order pulse on the conductor 44, the transistor 132 is enabled and the transistor 136 is disabled by the shift pulse. The conduction of the transistor 132 transfers the negative shift pulse to the base of the transistor 131 of the next stage thereby placing that stage in the reset condition, the prior condition of the order stage.

On the other hand, if the order stage is in the set condition and a negative input pulse is received via the conductor 43, the transistor 131 is operated to place the first stage in the reset condition. Coincidentally, the transistor 136 is operated by the shift pulse and the charge on the enabling capacitor 137 so that the next stage is placed in the set conditon. In this manner the condition of each memory stage is shifted to the succeeding stage on receipt of each shift pulse.

It is to be noted that the capacitors 133 and 137 are arranged with time constants appropriate to maintain the charge thereon until the shift pulse has been removed, even though the transistors 130 and 131 supplying current thereto may have changed condition. In this manner a change in condition of a memory stage does not affect the condition transferred to the succeeding stage during the application of the input pulse causing the change of condition.

After the first stage of the register has been set, succeeding pulses from the bipolar receiver 10 and the amplifier 11 operate to determine the first stage condition and to shift the prior condition of each stage until the complete order has been read into the register 14. When the last or prefix stage has been set, the voltage level of the transistor 130 thereof is transferred via a conductor 100 for operating the resetting circuit 15, shown in detail in FIG. 2, in a manner to be explained hereinafter, to produce a delayed resetting pulse. The resetting circuit 15 is operated and a resetting signal produced only when the prefix stage of the register 14 has been set. When the circuit 15 is operated a resetting pulse is received via a conductor 221 and input diodes 139 at each stage of the register 14. The negative resetting pulse saturates each of the transistors 131 to reset all stages.

When the prefix stage of the register 14 has been set, a second output is taken at the collector of the transistor 131 thereof as a second requisite enabling input for the prefix gate 19. The coincidence of this pulse with an execute pulse operates the gate 19 to provide a pulse to the translator 21 which is then enabled to read out the binary condition of the link number stages of the register 14 as presented, for example, at the collectors of the transistors 130 and 131 of each of those stages. The read out is accomplished via the conductors 230–237 and, as mentioned previously, takes place only upon the setting of the prefix stage of the register 14 in response to the complete read in of an order.

By the use of a binary-link number register 14, the number of links serviced by the concentrator may be substantially increased with the addition of but a minimum number of memory stages. For example, the addition of a single memory stage to the control circuitry allows twice the prior number of links to be utilized. Thus, a logic arrangement including the binary-coded link number register 14 may be adapted to situations wherein the number of links required are expected to greatly increase over a given period of time whereas other nonbinary registers may require the addition of a large amount of circuitry to realize this favorable result.

*Resetting Circuit*

The resetting circuit 15, shown in FIG. 2, receives a positive pulse via a lead 100 upon the setting of the last or prefix stage of the link number register 14. This input pulse is coupled by a differentiating capacitor 101 to the base of a n-p-n junction transistor 102 which is biased to be normally nonconducting. The positive spike produced from the input pulse by the differentiating capacitor 101 is applied at the base to saturate the transistor 102 and produce a negative pulse at the collector thereof. The negative pulse at the collector transistor 102 is transferred via a second differentiating capacitor 103 to a second n-p-n junction transistor 104, biased in the normally-off condition. Since only the trailing positive spike of the differentiated output of the transistor 102 is appropriate to operate the transistor 104, a delay is introduced between the setting of the prefix stage of the register 14 and the operation of the output transistor 104 of the resetting circuit.

The positive pulse saturates the output transistor 104 to produce a negative-going pulse at the collector. This delayed negative pulse is utilized to reset the order flip-flop 16 via conductor 220. The delay allows the network 270 to operate before releasing the order flip-flop 16. A second output is taken via conductor 221 at the midpoint between a resistor 106 and a capacitor 105 which are arranged in series between the collector and emitter terminals of the transistor 104. The charging time of the capacitor 105 is advantageously adapted to produce an exponentially decreasing output which may be utilized as a delayed resetting input to all of the stages of the link number register 14. The capacitor 105 thus provides a delay following the advent of the resetting pulse to the order flip-flop 16 which may be utilized if the execute circuit 17 is replaced with a flip-flop for resetting that flip so that transients in the register 14 cannot be translated.

*Prefix Gate*

The prefix gate 19, shown in FIG. 3, operates in response to the coincidence of an execute signal on conductor 123 and a setting signal from the prefix stage of the link number register 14. The gate 19 includes a first p-n-p junction transistor 140 biased in the normally-off condition. The execute pulses are supplied at the emitter while setting output from the prefix stage is applied at the base of the transistor 140. A capacitor 142 is connected in shunt with a resistor 143 at the base of the transistor 140 to control the prefix setting pulses applied thereat to be of an exponentially decreasing form. The delay introduced allows the register stages to assume steady state before the read-out thereof.

The exponentially decreasing input pulse at its base drives the transistor 140 into delayed saturation to transfer the positive execute pulse at the emitter to saturate a n-p-n junction transistor 144. The saturation of the transistor 144 reduces the potential at the collector thereof to provide a negative pulse which is directed by conductor 222 to operate the translator 21 for reading out the binary-coded link number in the link number register 14 and translating that number into information which may be utilized for connecting the appropriate link to the line selected by the counter 13.

*Release AND Gate*

The release AND gate 18 shown in FIG. 3 comprises a n-p-n junction transistor 145 which is connected to transfer the negative pulse appearing at the collector of the transistor 144 via conductor 223 on the operation of the prefix gate 19 to the service request blocking flip-flop 28 and the switching network 270 when the action to be taken with respect to a link is to release that link from service. The base of the transistor 145 is connected to receive a positive enabling pulse via a conductor 146 from the collector of transistor 131 of the input or order stage of the link number register 14 upon the resetting of that stage (which resetting signifies the release of the link). The positive pulse from the transistor 131 operates to saturate the transistor 145 and allow the transfer of the negative-going pulse from the prefix gate 19 to the blocking flip-flop 28 via a conductor 147 and to the network 270 via a conductor 141.

*Service Request Block Flip-Flop*

The service request block flip-flop 28 shown in FIG. 3 is placed in the set condition to disable the service request AND gate 29 upon receipt of an order by the concentrator from the remote concentrator control center control center 53 indicating that all of the links assigned to that remote concentrator are in use. The blocking order signal is sent to preclude the burden of unanswerable service request signals on various control center and transmission circuitry. The blocking order is received by the bipolar receiver 10 and processed through the link number register 14 to the translator 21.

When the code distinctive of the blocking order is received, the translator 21 produces a negative-going pulse which is directed via a conductor 240 and the delay circuit 33 to the base of a p-n-p junction transistor 151, biased in the normally-off condition. The negative input pulse causes the transistor 151 to saturate and a positive-going pulse appearing at the collector thereof is applied to the base of a second normally-off n-p-n junction transistor 152. The transistor 152 saturates upon receipt of the positive pulse at its base, and a negative potential at its collector is fed back to the base of the transistor 151 to lock the flip-flop 28 in the set condition. The negative potential appearing at the collector of the transistor 152 is also transferred via a conductor 224 to the service request AND gate 29 to remove enabling potential therefrom so that service requests cannot be transferred.

On receipt of a release order, the negative pulse from the release AND gate 18 is transferred by the conductor 147 to the base of the transistor 152 to reset the service request block flip-flop 28 and allow the use of the link which has become available on the release thereof. This negative pulse, received via a diode 153, disables the transistor 152 to increase the potential at the base of the transistor 151 for disabling that transistor 151 and resetting the flip-flop 28. On resetting, the positive potential at the collector of the transistor 152 is transferred via conductor 224 to enable the gate 29.

*Service Request "AND" Gate*

The service request "AND" gate 29, shown in FIG. 3, receives positive service request signals from line scanner and detector 260 shown in FIG. 1 via a conductor 160. This information is transmitted by a diode 161 to the emitter of a p-n-p junction transistor 162 only when a diode 164 is reverse biased by the positive reset voltage level at the collector of the transistor 152 of the flip-flop 28. The base of the transistor 162 receives negative enabling pulses via a conductor 163 from the advance pulse gate 29 to allow transmission of the service request pulses. Thus, when the service request block flip-flop 28 is in the reset condition and an advance pulse and a service request pulse are coincidentally received, the service request pulse will be transferred by the transistor 162 to the base of a n-p-n junction transistor 165. The positive service request pulse operates the transistor 165 to provide a positive output pulse at the emitter thereof which pulse is transferred via a conductor 166 and associated circuitry to the transceiver 22 for signaling to the control center 53 the indicated service request.

*The Mark Gate*

The mark gate 50 comprises a n-p-n transistor 51 having its base resistively connected via a conductor 52 to the collector of the transistor 130 (the "set" side) of the order stage of the register 14 and its emitter connected to the conductor 223 which transfers the output of the prefix gate 19 to the translator 21. When the prefix gate is operated to provide a reduced potential at the emitter of the transistor 51 coincidentally with the switching of the order stage of the register 14 to the set condition, the transistor 51 is saturated. The saturation of the transistor 51 produces a negative pulse at the collector thereof which is transferred via a line 54 to the concentrator switching network 270 shown in block form in FIG. 1. In the absence of either the prefix-execute pulse or the set condition of the order stage, the transistor 51 remains inoperative.

SPECIFIC CIRCUIT OPERATION

*The Advance Operation*

Each advance pulse appears on the signaling channel 30 as one in a continuing sequence of timed pulses transmitted from the remote concentrator control center, the sequence being interrupted only by pulses of order information having an identical time sequence. Each advance pulse received at the bipolar receiver 10 is of a polarity appropriate to operate the transistor 34 of the first channel and inappropriate to operate the transistor 35 of the second channel. Each advance pulse thus operates the first channel, producing a negative output pulse on the conductor 43 and operating the inhibiting circuitry including the transistor 39 to remove operating potential from the transistors 34 and 35 for a period sufficient to preclude spurious signals caused by transformer overshoot without interfering with the succeeding information pulses on the channel 30.

The output pulse produced on the conductor 43 is transferred to the transistor 131 of the first, or order, stage of the link number register 14 and to the transistor 91 of the advance pulse amplifier 11. Except in the presence of an incomplete order, an advance pulse is received at the concentrator only when all stages of the register 14 are in the reset condition, for the completion of any order is accompanied by the resetting of all stages by the resetting circuit 15. In the reset condition, the advance polarity input pulse has no effect to change the condition of the order stage of the register 14 or any of the circuitry operated in response thereto. Further, the shifting pulse produced in response to the same advance input by the output transistor 94 of the advance pulse amplifier 11, though transferred to each stage of the register 14, cannot affect the condition of any stage since it merely shifts a condition identical to the previous condition of each stage. Therefore the register 14, the translator 21, and various logically associated circuitry, not accomplishing line scanning, are effectively disabled during receipt of advance pulses.

On the other hand, the advance input to the transistor 91 of the advance pulse amplifier 11 produces a positive output pulse which is transferred via a conductor 96 for operating the advance pulse gate 24. Because the order flip-flop 16 is also placed in the reset condition on the completion of an order, the advance pulse gate 24 is enabled by the advance pulse from the amplifier 11. The pulse from amplifier 11 is shaped, delayed, and transferred to advance the scan control counter 13.

Assuming for illustration that the counter 13 is in the logical condition of its sequence wherein the last stage of each level is set awaiting receipt of the advance pulse, the input diodes 181 of each of the "0" and "00" stages will be conditioned by the sources 184 of the stages "9" and "50" through the saturated transistors 183 thereof to conduct the received advance pulse. All other input diodes 181 will be blocked by the voltages of the sources 186 applied thereto.

Upon receipt of the negative advance pulse, the "0" stage of the unit level is transferred to the set condition and a high positive output level appears at the collector of the transistor 182 thereof. The positive output level is amplified and inverted by the transistor 195 and transferred by a conductor 197 to set the "00" stage of the decimal level of the counter. As with the "0" stage, an output signal is produced at the collector of the transistor 182 thereof. These output pulses are transferred via leads 198 to provide the required control of the scanning and seizure operations performed with respect to the subscriber lines.

*The Synchronization Check*

The synchronization check is accomplished by the coincidence of an advance pulse and an execute pulse at the line concentrator when the scan control counter 13 is in the "59" condition. As explained supra, when an advance pulse is received, only the circuitry which assists in accomplishing line control is actuated. When the counter 13 reaches the condition of the scanning order wherein the last stage of each level is set by the advance pulse received, the transistor 200 of the AND gate 26 is enabled by the voltages at the collector of the transistor 182 of the "9" stage of the first level and at the collector of the transistor 183 of the "50" stage of the decimal level. The enabling of the gate 26 provides a negative pulse which is transferred by the conductor 201 to the synchronization test flip-flop 25.

When, on the setting of the last stages of the counter 13 it is desired to check the synchronization thereof with the control center equipment, an execute pulse is transferred to the concentrator on the channel 60 from the remote concentrator control center 53. This pulse is received and operates the receiver of the transceiver 22 to produce a negative output pulse on the conductor 74. The negative pulse is transferred by the conductor 74 to block the diode 203 of the synchronization test flip-flop 25 while the pulse from the AND gate 26 is transferred to block the diode 202 thereby allowing the potential of the source 204 to set the flip-flop 25.

As a next advance pulse is received and transferred to the counter 13, the first stages of each level thereof are set and provide output potentials on the conductors 199 and 207 for operating the transistor 210 of the AND gate 27. The enabling of the AND gate 27 provides a negative pulse which is transferred by the conductor 211 to disable the transistor 206 and thereby to reset the synchronization flip-flop 25. When the transistor 206 of the flip-flop 25 is rendered nonconductive, a positive voltage is produced and transferred via the diodes 212 and 213 and the conductor 75 to the transmitter of the transceiver 22. The positive input at the transceiver 22 operates the transistor 77 to produce a sinusoidal output at the winding 85, as explained hereinbefore. The sinusoidal pulse is transferred by the transformer 62 and the channel 60 to the remote concentrator control center 53 for utilization thereby in determining appropriate scanning synchronization.

*Registration of the Order*

As explained hereinbefore, an order directed to the remote concentrator comprises a first prefix pulse, a group of pulses indicating in binary form the appropriate link, and an order pulse designating the action to be taken. Since the prefix pulse accomplishes certain functions required before the link number and action information may be received, the receipt of the prefix pulse will be first discussed.

A prefix pulse on channel 30 from the remote concentrator control center 53 is of a polarity opposite that of an advance pulse and operates the second channel of the bipolar receiver 10 including the transistor 35 to provide a negative output pulse on the conductor 44. The negative pulse is transferred by the conductor 44 coincidentally to the order flip-flop 16, the advance pulse amplifier 11, and the input stage of the link number register 14.

The negative pulse transferred to the order flip-flop 16 on the conductor 44 saturates the transistor 110 and renders the transistor 111 nonconducting, thereby setting the flip-flop 16. The set condition of the flip-flop 16 provides a first positive voltage at the collector of the saturated transistor 110 which is transferred by the conductor 117 to enable the transistor 124 of the execute gate 23 for the transmission of negative execute pulses to the execute circuit 17. The set condition of the order flip-flop 16 also provides a second lower-level positive output voltage at the collector of the off transistor 111 which is transferred by a conductor 121 and a diode 176 to clamp the input at the base of the transistor 170 of the advance pulse gate 29 below operating level. The clamping action at the transistor 170 precludes the transmission of advance polarity pulses, thereby requiring the counter 13 to remain in control of the subscriber line which was controlled on receipt of the prefix pulse until the clamping voltage is removed by the resetting of the order flip-flop 16.

The receipt of the negative prefix pulse at the base of the transistor 90 operates the advance pulse amplifier 11 to produce a negative output pulse at the collector of the transistor 94 for transfer by the conductor 95 for shifting all stages of the link number register 14. It is to be noted that the advance pulse amplifier 11 accomplishes the dual purposes of producing shifting and advance pulses thereby reducing the overall complexity of the remote concentrator circuitry.

The shifting pulse from the amplifier 11 is transferred by the conductor 95 to the interstage memory circuitry of the link number register 14. Since all of the register stages are in the reset condition when the shift pulse initiated by the prefix pulse is received, each memory capacitor 133 will be charged to enabling potential and the interstage transistors 132 will all be saturated. This saturation, and the transferral of the negative shift pulse, however, have no effect on succeeding stages which are already in the reset condition. Thus, all of the stages except the input stage remain in the reset condition while the input stage has its condition determined by the input pulse received on the conductor 44.

Since the prefix stage of the register 14 remains in the reset condition neither the prefix gate 19 nor any other of the following circuitry is actuated.

The input pulse at the first stage of the register 14 is applied substantially coincidentally with the shifting pulse. It causes the transistor 130 to saturate thereby disabling the priorly-on transistor 131 and setting the first stage. The saturation of the transistor 130 increases current to the capacitor 137 and causes the charge thereon to increase slowly while the effective disconnection of the source 134 and the substitution therefor of the lower-valued potential of the source 138 reduce the current to the capacitor 133 and the charge thereon. In this manner the biasing of the interstage transistors 132 and 136 is prepared for the next shifting pulse.

As is obvious, all pulses of an order group following the prefix pulse have an effect on the concentrator substantially identical to that of the prefix pulse until the set condition is shifted to set the last or prefix stage of the register 14. Each order pulse, whether of a polarity such as to provide an output on the conductor 43 or the conductor 44 of the bipolar receiver 10, causes the advance pulse amplifier 11 to produce a shifting pulse thereby advancing the portion of the order in the register 14 by one stage. Each pulse also provides additional information to the order by placing the first stage of the register 14 in the condition indicative of that added information. And even though each order pulse appearing on conductor 43 provides a pulse on the conductor 96 for transfer to the advance pulse gate 24, the clamping of the gate 24 by the potential from the set order flip-flop 16 precludes the advancing of the counter 13.

When the last bit of information required to complete the order is sent to the concentrator, the prefix stage of the register 14 is placed in the set condition. A potential is provided at the collector of the transistor 131 of the prefix stage for enabling the prefix gate 19 to transfer an execute pulse should such a pulse be directed to that one of the line concentrators associated with the given remote concentrator control circuitry. Assuming for the moment that the execute pulse is directed to another concentrator, neither the prefix gate 19, the circuitry connected thereto, the translator 21, the blocking flip-flop 28, the release gate 18, nor the mark gate 50 are operated. Thus the order is not read out of the register 14 for use by that concentrator.

However, even though an execute pulse has not been received, the concentrator must be cleared for receipt of further control information. For this purpose an output is taken from the transistor 130 of the prefix stage of the register 14 and transferred by the conductor 100 to operate the resetting circuit 15. The resetting circuit 15 provides a delay to allow for the late receipt of an execute pulse and the transfer thereof, and for the operation of the network 270, and then furnishes an output at the collector of the transistor 104 which is transferred by a conductor 220 for resetting the order flip-flop 16. The resetting of the order flip-flop 16 removes the enabling potential from the transistor 124 of the execute gate 23 so that further execute pulses are transferred only to the synchronization test flip-flop 25. The resetting of flip-flop 16 also removes the disabling potential applied at the base of the transistor 170 of the advance pulse gate 24 to allow succeeding advance pulses to operate the scan counter 13.

As explained, the resetting circuit 15 produces an additional output pulse on the conductor 221 which is delayed from the aforementioned resetting pulse by the action of the capacitor 105. The negative pulse on the conductor 221 is applied to saturate the transistor 131 of each memory stage and reset all of the memory stages. Thus all stages of the register 14 are placed in the reset condition upon the complete receipt of each order.

Of especial note is the self-clearing action above mentioned. Whenever the register 14 is placed in the condition wherein the last stage is set, clearing is automatically accomplished. Since shift pulses are provided by advance as well as by order information, an incomplete order will be shifted through the register 14 and cleared in response to advance pulses following the incomplete order so that the concentrator is never "locked-up" awaiting an incomplete order. Further, as will be explained, the incomplete order will not be executed in response to the clearing.

*The Execution of the Order*

Assuming now that the complete order has been read into the link number register 14 and is to be executed at that concentrator, an execute pulse is received on the signaling channel 60 substantially coincident with the receipt of the last order pulse. The execute pulse operates the receiver of the transceiver 22 to provide an output on the conductor 74 for transfer to the synchronization test flip-flop 25 and the execute gate 23. Normally the pulse at the test flip-flop 25 has no setting effect. However, should the counter 13 be in the condition to actuate the AND gate 26, the test flip-flop 25 is set and awaits the next advance pulse before resetting to provide a synchronization pulse for transfer to the central office. To relieve any possibility of confusion between execute and test pulses, the positions "59" and "00" are normally not connected to line circuits. In this manner execute pulses are not sent when the counter 13 controls either of these positions; and, since the "59" position is the only one in which a test signal is sent, there can be no confusion.

It will be noted that the use of the execute gate 23 with the transceiver 22 and associated circuitry provides that identical execute and test signals may be transferred by the channel 60 without interference. In this manner the amount of outside wire necessary to the utilization of a concentrator system is substantially reduced.

As noted, the order flip-flop 16 is set by the prefix pulse so that the execute gate 23 is enabled to transfer the execute pulse to the conductor 122. The pulse on the conductor 122 saturates the transistor 112 and disables the transistor 113 to set the execute circuit 17 and provide a positive output level for a predetermined period on the conductor 123. The positive potential is transferred by the conductor 123 to the emitter of the gating transistor 140 of the prefix gate 19. The transistor 140, being enabled by the setting of the prefix stage of the register 14, transfers the execute pulse to the transistor 144 for amplification and thence by a conductor 222 to the translator 21. On receipt of the execute pulse the translator 21 is actuated and reads out the binary condition of the intermediate stages of the register 14 appearing as voltage levels on the conductors 230–237. The translator 21 translates the received information and provides an output signal distinct to that information on one of the output conductors, such as 240–249. The output signals transferred to the switching network 270 are adapted to accomplish the seizure of the designated link while other output signals are adapted to accomplish some control operation at the concentrator if the order furnished is not indicative of a link number, e.g., to operate the blocking flip-flop 28 to preclude service request signals from the signaling channel 60. It will be noted that the execute circuit 17 remains on for a predetermined period less than the period between two advance or two order pulses. Thus the prefix gate 19 is enabled for a period on the coincidental receipt of the last order pulse and the execute pulse, but is disabled by the time the next advance pulse appears. In this manner, even though an incomplete order group is later shifted so that the prefix stage of the register 14 is set, the incomplete order is not executed because no execute pulse is available for enabling the prefix gate 19.

In addition to providing a signal for operating the translator 21, the output of the prefix gate 19 on execution of the order is transferred by a conductor 223 to the release gate 18 and the execute output is transferred by the conductor 53 to the mark gate 50. If the action to be taken with respect to a link is to release the link from service so that an additional link will be available, the input or order stage of the register 14 is in the reset condition. This condition provides a high potential via a conductor 146 at the base of the transistor 145 enabling the release gate 18 to transfer the pulse on the conductor 223 via the conductor 147 for providing a resetting pulse to the blocking flip-flop 28. Since the blocking flip-flop 28 is normally reset, except in the extremely rare case in which all links are in use, the release-execute pulse has no effect thereon. The operation of the release gate 18 also provides a pulse via conductor 141 to cause the network 270 to release the designated link while the operation of the mark gate 54 provides for seizure of the link.

*Blocking Service Request Pulses*

If the links connected to a remote line concentrator are all in use and additional service requests cannot be answered but merely cause an unnecessary load on the transmission channels and the circuitry of the remote concentrator control center 53, the control center 53 is so apprised and directs a blocking order to that remote concentrator. This order is of standard order form, is registered by the register 14, and, on execution, is read into the translator 21. Since the order may have a release suffix, the execution will provide a pulse from the release gate 18 for resetting the blocking flip-flop 28. The translator 21 provides, in response to the blocking order, a negative output pulse on the conductor 240. This pulse is transferred via the delay circuit 33 to the base of the transistor 151 of the service request blocking flip-flop 28 and accomplishes the setting thereof, as explained hereinbefore. The delay circuit 33 provides for the elimination of interference between the resetting pulse sent from the release gate 18 and the setting pulse from translator 21 by delaying the application of the setting pulse until termination of the resetting signal.

The setting of the flip-flop 28 provides ground at the collector of the saturated transistor 152 to enable the diode 164 of the service request AND gate 29 and clamp the emitter of the transistor 162 so that service request pulses from the detector 260 via the conductor 160 are not transferred to the transceiver 22 during the set condition of the flip-flop 28.

When an order is received for the release of a link, the order stage of the register 14 is placed in the reset condition. The voltage at the collector of the saturated transistor 131 of that stage is applied as an enabling pulse to enable the release gate 18 to transfer the output pulse from the prefix gate 19. This combination release-execute pulse is transferred by the conductor 147 to reset the blocking flip-flop 28 and remove the disabling voltage from the service request AND gate 29. With the removal of the disabling voltage, service requests on the conductor 160 may be transferred by the gate 29 to the transceiver 22 so that the released link may be utilized.

*Resetting the Scan Control Counter*

When, on failure to receive the expected synchronization test signal at the remote concentrator control circuitry 53, it is determined that the counter 13 is not in correct synchronization with the scanning cricuitry of the control center 53, the counter 13 must be placed in synchronization therewith. To accomplish this, an order is sent to the concentrator when the control center scan equipment arrives at the condition wherein the position controlled by the first stage of each level of the counter 13 is being scanned. The order is read into the register 14, executed and transferred to the translator 21, and appears as a negative pulse on the conductor 241. The negative pulse is transferred by the conductor 241 via diodes 194 to the base of the transistors 182 of the first memory stage of each level of the counter 13 to set those stages. Coincidentally, the negative pulse is applied via the diodes 196 to the base of the transistors 183 of all other memory stages to reset those stages. Thus, the reset order synchronizes the counter 13 with that of the remote control center to provide for proper operation of the concentrator and associated circuitry.

The values of various circuitry disclosed in the drawing are to be understood as merely representative of typical values which may be utilized. It is to be understood that the above-described arrangement is illustrative of the application of the principles of the invention. Numerous other arrangements may be devised by those skilled in the art without departing from the spirit and scope of the invention.

What is claimed is:

1. In a telephone line concentrator, a system for controlling the connection of subscriber line circuits to talking paths to a central office comprising control information receiving means, means for selecting a predetermined line circuit operative responsive to the receipt of control information indicative thereof, means for disabling said line circuit selecting means operative responsive to the receipt of control information indicative of a predetermined operation to be accomplished by said concentrator, means for registering received control information indicative of a predetermined operation to be accomplished by said concentrator, means operative responsive to the receipt of registered control information for selecting the control function to be accomplished, execute information receiving means, and means operative responsive to the receipt of execute information for transferring said registered control information to said means for selecting the control function to be accomplished.

2. A system as in claim 1 wherein said control information receiving means includes a bipolar receiver arranged to receive information from a concentrator control center.

3. A system as in claim 1 wherein said line circuit selecting means includes a ring counter circuit connected to all of the subscriber line circuits.

4. A system as in claim 3 wherein said means for disabling said line selecting means includes gating means connected between said line selecting means and said control information receiving means, and means for disabling said gating means operative responsive to the receipt of control information indicative of a predetermined operation to be accomplished by said concentrator.

5. A system as in claim 1 wherein said means for registering control information includes a binary-coded shift register circuit.

6. A system as in claim 5 wherein said means for selecting the control function to be accomplished includes means for translating the registered binary control information to decimal information.

7. A system as in claim 1 wherein said means for selecting the control function to be accomplished includes means for translating information in a first number base to information in a second number base.

8. A system as in claim 1 wherein said execute information receiving means includes a transceiver circuit having a receiver for receiving the execute information.

9. A circuit as in claim 1 wherein said means for transferring said registered control information to said means for selecting the control function to be accomplished includes gating means therebetween and means operative responsive to execute information received for enabling said gating means.

10. In a telephone line concentrator, a system for controlling the connection of subscriber line circuits to talking paths to a central office comprising a bipolar receiver circuit for receiving control information signals, means operative responsive to the receipt of control information signals indicative of a predetermined subscriber line circuit for selecting said predetermined line circuit including a ring counter circuit connected to all of the associated subscriber line circuits, means operative responsive to the receipt of control information signals indicative of a predetermined operation to be accomplished by said concentrator for disabling said line selecting means, means including a binary-coded shift register circuit for registering control information signals indicative of a predetermined operation to be accomplished by said concentrator, means operative responsive to the receipt of registered control information signals for selecting the control function to be accomplished, a transceiver circuit including a receiver for receiving execute information signals, and means operative responsive to the receipt of execute information signals by said transceiver for transferring said registered control information signals to said means for selecting the control function to be accomplished.

11. A system as in claim 10 wherein said means for disabling said line selecting means includes gating means connected between said bipolar receiver circuit and said ring counter circuit, and means connected to said bipolar receiving circuit for disabling said gating means.

12. A system as in claim 10 wherein said means for selecting the control function to be accomplished includes means for translating binary control information signals to decimal signals.

13. A system as in claim 10 wherein said means for transferring said registered control information signals includes gating means connecting said shift register circuit to said means for selecting the control function to be accomplished, and means operative responsive to the receipt of execute signals for enabling said gating means.

14. In a telephone line concentrator, a system for controlling the connection of subscriber line circuits to talking paths to a central office comprising a bipolar receiver circuit for receiving control information signals, means operative responsive to the receipt of control information signals indicative of a predetermined subscriber line circuit for selecting said predetermined line circuit including a ring counter circuit connected to all of the associated subscriber line circuits, first gating means connecting said bipolar receiver to said ring counter, means operative responsive to the receipt of control information signals indicative of a predetermined operation to be accomplished by said concentrator to disable said first gating means, means including a binary-coded shift register circuit for registering control information signals indicative of a predetermined operation to be accomplished by said concentrator, means operative responsive to the receipt of registered control information signals for selecting the control function to be accomplished including means for translating binary information signals to decimal information signals, a transceiver circuit including a receiver for receiving execute information signals, second gating means connecting said bipolar receiver to said means for selecting the control function, and means operative responsive to the receipt of execute information signals by said transceiver for enabling said second gating means.

15. In a telephone line concentrator, a system for controlling the connection of subscriber line circuits to talking paths to a central office comprising control information receiving means, means operative responsive to the receipt of control information indicative of a predetermined subscriber line circuit for selecting said predetermined line circuit, means operative responsive to the receipt of control information indicative of a predetermined operation to be accomplished by said concentrator for disabling said line circuit selecting means, means for registering control information indicative of a predetermined operation to be accomplished by said concentrator, means operative responsive to the receipt of registered control information for selecting the control function to be accomplished, execute information receiving means, means operative responsive to the receipt of execute information for transferring registered control information to said means for selecting the control function to be accomplished, and means operative responsive to the receipt of a complete control information signal indicative of a predetermined operation to be accomplished for resetting said system to render said system operative responsive to succeeding control information.

16. A system as in claim 15 wherein said control information receiving means comprises a bipolar receiver circuit, said means for selecting said one line circuit includes a ring counter circuit connected to all of the line circuits, said means for registering control information includes a binary-coded shift register circuit, and said execute information receiving means includes a transceiver having a receiver circuit for receiving said execute information.

17. A system as in claim 16 wherein said means for disabling said line circuit selecting means includes first gating means connected between said ring counter circuit and said bipolar receiver circuit, and means operative responsive to the receipt of said control information signals indicative of a predetermined operation to be accomplished for disabling said first gating means; said means for selecting the control function to be accomplished includes a circuit for translating binary-coded information to decimal-coded information; said means for transferring registered control information includes a second gating means connected between said shift register circuit and said means for selecting the control function to be accomplished, and means operative responsive to the receipt of execute information for enabling said second gating means; and further comprising means operative responsive to the operation of said ring counter circuit for providing a signal to said transceiver circuit indicative of the synchronization of said ring counter circuit.

18. In a telephone line concentrator, a system for controlling the connection of subscriber line circuits to talking paths to a central office comprising control information receiving means, means operative responsive to the receipt of control information indicative of a predetermined subscriber line circuit for selecting said predetermined line circuit, means operative responsive to the receipt of control information indicative of a predetermined operation to be accomplished by said concentrator for disabling said line circuit selecting means, means for registering control information indicative of a predetermined operation to be accomplished by said concentrator, means operative responsive to the receipt of registered control information for selecting the control function to be accomplished, execute information receiving means, means operative responsive to the receipt of execute information for transferring said registered control information to said means for selecting the control function to be accomplished and means operative responsive to the operation of said line circuit selecting means for providing a signal indicative of the synchronization condition thereof.

19. A system as in claim 18 wherein said execute information receiving means includes a transceiver having receiver means for receiving execute information and transmitter means for transmitting signals indicative of the synchronization condition of said line circuit selecting means to a remote concentrator control center.

20. In a telephone line concentrator, a system for controlling the connection of subscriber line circuits to talking paths to a central office comprising control information receiving means, means operative responsive to the receipt of control information indicative of a predetermined subscriber line circuit for selecting said predetermined line circuit, means operative responsive to the receipt of control information indicative of a predetermined operation to be accomplished by said concentrator for disabling said line circuit selecting means, means for registering control information indicative of a predetermined operation to be accomplished by said concentrator, means operative responsive to the receipt of registered control information for selecting the control function to be accomplished, execute information receiving means, means operative responsive to the receipt of execute information for transferring said registered control information to said means for selecting the control function to be accomplished, and means operative responsive to a predetermined registered control signal for resetting the synchronization condition of said line circuit selection means.

21. A system as in claim 20 further comprising means operative responsive to the operation of said line circuit selecting means for providing a signal indicative of the synchronization condition thereof.

22. In a telephone line concentrator, a system for controlling the connection of subscriber line circuits to talking paths to a central office comprising control information receiving means, means operative responsive to the receipt of control information indicative of a predetermined subscriber line circuit for selecting said predetermined line circuit, means operative responsive to the receipt of control information indicative of a predetermined operation to be accomplished by said concentrator for disabling said line circuit selecting means, means for registering control information indicative of a predetermined operation to be accomplished by said concentrator, means operative responsive to the receipt of registered control information for selecting the control function to be accomplished, execute information receiving means, means operative responsive to the receipt of execute information for transferring said registered control information to said means for selecting the control function to be accomplished, means operative responsive to the operation of said line circuit selecting means for providing a signal indicative of the synchronization condition thereof, means operative responsive to a predetermined register control signal for resetting the synchronization condition of said line circuit selecting means, and means operative responsive to the registration of a complete control information signal for resetting said system whereby said system is rendered operative responsive to succeeding control information signals.

23. In a telephone line concentrator, a system for controlling the connection of subscriber line circuits to talking paths to a central office comprising a bipolar receiver circuit for receiving control information signals, means operative responsive to the receipt of control information signals indicative of a predetermined subscriber line circuit for selecting said predetermined line circuit including a ring counter circuit connected to all of the associated subscriber line circuits, means operative responsive to the receipt of control information signals indicative of a predetermined operation to be accomplished by said concentrator for disabling said line circuit selecting means, means including a binary-coded shift register circuit for registering control information signals indicative of a predetermined operation to be accomplished by said concentrator, means operative responsive to the receipt of registered control information signals for selecting the control function to be accomplished, a transceiver circuit including a receiver for receiving execute information signals and a transmitter, means operative responsive to the receipt of execute information signals by said transceiver for transferring registered control information signals to said means for selecting the control function to be accomplished, means operative responsive to the operation of said line circuit selecting means for providing a signal indicative of the synchronization condition thereof, means operative responsive to a predetermined registered control information signal for resetting the synchronization condition of said line circuit selecting means, and means operative responsive to the registration of a complete control information signal for clearing said system whereby said system is rendered operative responsive to succeeding control information signals.

24. In a telephone system, remote line concentrator control circuitry comprising a single means for receiving all order and advance information, line selection means operative responsive to the receipt of advance information by said receiving means for scanning a number of associated subscriber line circuits, means operative responsive to the receipt of order information by said receiving means for causing said line selection means to select one of the associated line circuits, means for registering order information received by said receiving means, and means responsive to the receipt of registered order information for providing signals for accomplishing the predetermined orders.

25. Line concentrator control circuitry as in claim 24 wherein said receiving means includes a two-channel receiver circuit connected for receiving signals from a line concentrator control center.

26. Line concentrator control circuitry as in claim 24 wherein said line selection means comprises a ring counter circuit connected to each individual associated subscriber line circuit.

27. Line concentrator control circuitry as in claim 24 wherein said means for registering order information comprises a binary-coded shift register circuit.

28. In a telephone system, remote line concentrator control circuitry comprising a two-channel receiver circuit for receiving order and advance information, line selecting means operative responsive to the receipt of advance information by said receiver circuit for scanning all of a number of associated subscriber line circuits including a ring counter circuit connected to each individual associated line circuit, means operative responsive to the receipt of order information by said receiver circuit for causing said line selection means to select one of the subscriber line circuits, a binary-coded shift register circuit for registering order information received by said receiver circuit, means responsive to the receipt of registered order information for providing signals for accomplishing predetermined functions, a transceiver circuit for receiving execute signals, and means operative in response to the receipt of an execute signal by said transceiver circuit for transferring registered order information to said means for providing signals for accomplishing predetermined functions.

29. Remote line concentrator control circuitry as in claim 28 wherein said means for causing said line selecting means to select one of the line circuits comprises gating means connected between said ring counter circuit and said receiver circuit, and means for applying a disabling potential to said gating means in response to the receipt of order information by said receiver circuit.

30. Remote line concentrator control circuitry as in claim 28 wherein said means for transferring registered order information comprises gating means connected between said shift register circuit and said means for providing signals for accomplishing predetermined functions, and means for applying an enabling potential to said gating means in response to the receipt of execute information by said transceiver circuit.

31. Remote line concentrator control circuitry as in claim 28 wherein said means for providing signals for accomplishing predetermined functions comprises means for translating binary information to decimal information.

32. In a telephone system, remote line concentrator control circuitry comprising a two-channel receiver circuit for receiving order and advance information, a ring counter circuit connected to each of a number of associated line circuits and operative responsive to the receipt of advance information by said receiver circuit for scanning all of the associated line circuits, first gating means connecting said ring counter circuit to said receiver circuit, means operative responsive to the receipt of order information by said receiver circuit for applying disabling potential to said first gating means, a binary-coded shift register circuit for registering order information received by said receiver circuit, a translating circuit for changing binary information to decimal information, a transceiver circuit for receiving execute signals, second gating means connecting said translating circuit to said binary-coded shift register circuit, and means operative responsive to the receipt of an execute signal by said transceiver circuit for enabling said second gating means.

33. In a telephone system as in claim 32, remote line concentrator control circuitry further comprising means operative responsive to the operation of said ring counter circuit for providing a signal to said transceiver circuit indicative of the synchronization condition of said counter circuit.

34. In a telephone system as in claim 32, remote line concentrator control circuitry further comprising means operative responsive to a decimal information signal produced by said translating circuit for resetting the synchronization condition of said ring counter circuit.

35. In a telephone system as in claim 32, remote line concentrator control circuitry further comprising means operative responsive to the registration of a complete order signal by said shift register circuit for clearing said control circuitry.

36. In a telephone system, remote line concentrator control circuitry comprising a two-channel receiver circuit for receiving order and advance information, a ring counter circuit connected to each of a number of associated line circuits and operative responsive to the receipt of advance information by said receiver circuit for sequentially scanning said line circuits, first gating means connecting said ring counter circuit to said receiver circuit, means operative responsive to the receipt of order information by said receiver circuit for applying disabling potential to said first gating means, a binary-coded shift register circuit for registering order information received by said receiver circuit, a translating circuit for changing registered information of binary form to output information of decimal form, a transceiver circuit for receiving execute signals, second gating means connecting said translating circuit to said binary-coded shift register circuit, means including said second gating means operative responsive to the receipt of an execute signal by said transceiver circuit for transferring registered order information to said translating circuit, means operative responsive to the operation of said ring counter circuit for providing a signal to said transceiver circuit indicative of the synchronization condition of said ring counter circuit, means operative responsive to a decimal information signal produced by said translating circuit for resetting the synchronization condition of said ring counter circuit, and means operative responsive to the registration of a complete order signal by said shift register circuit for clearing said control circuitry.

37. In a telephone line concentrator for connecting a number of subscriber line circuits to a central office, a control circuit comprising a two-channel bipolar receiver circuit for receiving advance and order control information; means for amplifying the output of each channel of said receiver; first gating means connected to said amplifying means for transferring amplified advance information; a first bi-stable circuit operative responsive to the receipt of order information by said receiver circuit for disabling said first gating means; a ring counter circuit connected for consecutively scanning the associated line circuits in response to transferred advance information, a binary-coded shift register circuit having input means connected to receive the output of each of said receiver channels; a binary-to-decimal translator circuit; second gating means connecting said translator circuit to the output of said shift register circuit; a transceiver circuit including transmitting means, and receiving means for receiving execute information; a monostable circuit operative responsive to the receipt of execute information by said receiving means of said transceiver circuit for enabling said second gating means; and a resetting circuit operative responsive to the registration of a complete order by said shift register circuit for resetting said shift register, and said first bistable circuit.

38. A control circuit as in claim 37 further comprising a first AND gate operative responsive to a first condition of said ring counter circuit for producing an output pulse, a second bistable circuit operative to assume a first condition responsive to the coincidental receipt of execute information from transceiver receiving means and said output pulse from said first AND gate, a second AND gate operative responsive to the condition of said ring counter circuit succeeding said first condition for placing said second bistable circuit in a second condition to produce an output synchronization pulse therefrom, and means for transferring said synchronization pulse to said transceiver transmitting means.

39. A control circuit as in claim 37 further comprising a service request AND gate, a third bistable circuit operative responsive to a predetermined output of said translator circuit for disabling said AND gate, and a release circuit operative responsive to the coincidental enabling of said second gating means and a predetermined condition of said shift register circuit for resetting said bistable circuit to enable said AND gate.

40. In a telephone line concentrator for connecting a number of subscriber line circuits to a central office, a control circuit comprising a two-channel bipolar receiver circuit for receiving advance and order control information; means for amplifying the output of each channel of said receiver; first gating means connected to said amplifying means for transferring amplified advance information; a first bistable circuit operative responsive to the receipt of order information by said receiver circuit for disabling said first gating means; a ring counter circuit connected for consecutively scanning the associated line circuits in response to transferred advance information; a binary-coded shift register circuit having input means connected to receive the output of each of said receiver channels; a binary-to-decimal translator circuit; second gating means connecting said translator circuit to the output of said shift register circuit; a transceiver circuit including transmitter means and means for receiving execute information; a monostable circuit operative responsive to the receipt of execute information by said receiving means of said transceiver circuit for enabling said second gating means for a predetermined period; a resetting circuit operative responsive to the registration of a complete order by said shift register circuit for resetting said shift register, and said first bistable circuit; a first AND gate operative responsive to a first condition of said ring counter circuit for producing an output pulse, a second bistable circuit operative to assume a first condition responsive to the coincidental receipt of execute information from said transceiver means for receiving execute signals and an output pulse from said first AND gate; a second AND gate operative responsive to the condition following said first condition of said ring counter circuit for placing said second bistable circuit in a second condition to produce an output synchronization pulse therefrom; means for transferring said synchronization pulse to said transceiver transmitter means; a service request AND gate; a bistable blocking circuit operative responsive to a predetermined output of said translator circuit for disabling said service request AND gate; and means operative responsive to the coincidental enabling of said second gating means and a predetermined condition of said shift register circuit for resetting said bistable blocking circuit to enable said service request AND gate whereby service request signals are transferred to said transmitter means of said transceiver circuit.

No references cited.